United States Patent
Yamada et al.

(10) Patent No.: US 10,235,270 B2
(45) Date of Patent: Mar. 19, 2019

(54) METHOD FOR ASSISTING WITH DEBUGGING, AND COMPUTER SYSTEM

(71) Applicant: HITACHI, LTD., Tokyo (JP)

(72) Inventors: Hiroyuki Yamada, Tokyo (JP); Hirokazu Taniyama, Tokyo (JP); Masashi Nakaoka, Tokyo (JP); Masatoshi Yoshida, Tokyo (JP); Yuki Shimizu, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 15/740,242

(22) PCT Filed: Oct. 26, 2015

(86) PCT No.: PCT/JP2015/080089
§ 371 (c)(1),
(2) Date: Dec. 27, 2017

(87) PCT Pub. No.: WO2017/072828
PCT Pub. Date: May 4, 2017

(65) Prior Publication Data
US 2018/0189165 A1 Jul. 5, 2018

(51) Int. Cl.
*G06F 11/36* (2006.01)
*G06F 9/44* (2018.01)
(Continued)

(52) U.S. Cl.
CPC .......... *G06F 11/362* (2013.01); *G06F 11/28* (2013.01); *G06F 11/3664* (2013.01); *G06F 9/44536* (2013.01)

(58) Field of Classification Search
CPC .............. G06F 11/323; G06F 11/3636; G06F 11/3466; G06F 8/34; G06F 8/41;
(Continued)

(56) References Cited

U.S. PATENT DOCUMENTS 8,375,366 B2 * 2/2013 Agarwala ........... G06F 11/3636
710/20
8,522,213 B2 * 8/2013 Fuhrer ................. G06F 11/362
717/125

(Continued)

FOREIGN PATENT DOCUMENTS

JP      H06-139108 A     5/1994
JP      2007-072712 A    3/2007
(Continued)

OTHER PUBLICATIONS

Dinges et al., Targeted test input generation using symbolic-concrete backward execution, 6 pages (Year: 2014).*

(Continued)

*Primary Examiner* — Thuy Dao
(74) *Attorney, Agent, or Firm* — Volpe and Koenig, P.C.

(57) ABSTRACT

In testing a component-set whole process which includes a plurality of components and in which the order of execution of the plurality of components is defined, a computer system exports, to a storage resource, an input package for at least one component to be executed. Each of the plurality of components is a module of a significant process as a set of one or more processing steps and independent of any other components. Each input package includes an input value of a component that corresponds to the input package. The computer system imports an exported input package of a component to be debugged into the component to be debugged in order to execute the component to be debugged, without executing a component the order of which precedes the order N (where N is a natural number) of the component to be debugged.

11 Claims, 20 Drawing Sheets

(51) Int. Cl.
*G06F 9/30* (2018.01)
*G06F 11/28* (2006.01)
*G06F 9/445* (2018.01)

(58) Field of Classification Search
CPC .. G06F 2201/865; G06F 11/362; G06F 11/28;
G06F 11/3664; G06F 11/3648; G06F
11/3668; G06F 9/44536
See application file for complete search history.

(56) References Cited

U.S. PATENT DOCUMENTS

| | | | |
|---|---|---|---|
| 8,978,017 B2* | 3/2015 | Sohm | G06F 11/323 |
| | | | 717/128 |
| 9,009,541 B2* | 4/2015 | Gulati | G06F 11/22 |
| | | | 714/45 |
| 9,047,404 B1* | 6/2015 | Jibaly | G06F 11/362 |
| 9,619,366 B1* | 4/2017 | Huang | G06F 11/362 |
| 2016/0147637 A1* | 5/2016 | Bhagavan | G06F 11/3664 |
| | | | 717/127 |
| 2017/0075789 A1* | 3/2017 | Skinner | G06F 11/3664 |

FOREIGN PATENT DOCUMENTS

| | | |
|---|---|---|
| JP | 2009-301352 A | 12/2009 |
| JP | 2012-159952 A | 8/2012 |

OTHER PUBLICATIONS

International Search Report for WO 2017/072828 A1, dated Jan. 26, 2016.
Japanese Office Action dated Aug. 7, 2018 for the Japanese Patent Application No. 2017-547206.

* cited by examiner

FIG. 12

Component management table
421

| # | Component name | Version | Execution file path | Component uk |
|---|---|---|---|---|
| 1 | Provisioning volume | 01.00.00 | C:\HCSA\ProvisioningVolume\010000\···.bat | 5 |
| 2 | Provisioning volume | 01.10.00 | C:\HCSA\ProvisioningVolume\011000\···.bat | 6 |
| 3 | Create pair volume | 01.00.00 | C:\HCSA\CreatePairVolume\010000\···.bat | 7 |
| 4 | ... | ... | ... | ... |

Component property management table
422

| Compo-nent uk (701) | Key name (702) | Property name (703) | Description (704) | Mode (705) | Data type (706) | Input condition (707) | Property value (708) | Update permission (709) | Mapping target (710) | Necessity (711) |
|---|---|---|---|---|---|---|---|---|---|---|
| 3 | Prop1 | Input 1 | User name | In | String type | 10 characters or less | User | True | - | Required |
| 3 | Prop2 | Input 2 | Password | In | String type | 5 characters or more | Password | True | - | Required |
| 3 | Prop3 | Input 3 | Command | In | String type | - | xxx | False | - | Required |
| 3 | Prop4 | Input 4 | Argument | In | JSON type | - | {value:1, ...} | True | - | Required |
| 3 | Out1 | Output 1 | Return value | Out | Numeric type | - | - | True | - | - |
| 3 | Out2 | Output 2 | Message | Out | String type | - | - | True | - | - |
| ... | ... | ... | ... | ... | ... | ... | ... | ... | ... | ... |
| 3 | OutX | Output X | Outputting of command | Out | JSON type | - | {out:1, ...} | True | Map1 | - |

FIG. 14

Component property management table
422

| Compo-nent uk 701 | Key name 702 | Property name 703 | Description 704 | Mode 705 | Data type 706 | Input condition 707 | Property value 708 | Update permission 709 | Mapping target 710 | Necessity 711 |
|---|---|---|---|---|---|---|---|---|---|---|
| 4 | Prop 1 | Input 1 | Argument | In | JSON type | - | {value:1, ...} | True | Map1 | Required |
| 4 | Out1 | Output 1 | Return value | Out | Numeric type | - | - | True | - | - |
| 4 | Out2 | Output 2 | Message | Out | String type | - | - | True | - | - |

FIG. 15

Export-import property table
1500

| Key name | Property name | Description | Property value |
|---|---|---|---|
| Prop1 | Input 1 | User name | User |
| Prop2 | Input 2 | Password | Password |
| Prop3 | Input 3 | Command | xxx |
| Prop4 | Input 4 | Argument | {value:1, ...} |

Columns: 1501, 1502, 1503, 1504

FIG. 16

Service maintenance property table
1600

| Key name | Data type | Property value |
|---|---|---|
| Map1 | JSON type | — |

Columns: 1601, 1602, 1603

METHOD FOR ASSISTING WITH DEBUGGING, AND COMPUTER SYSTEM

TECHNICAL FIELD

The present invention generally relates to debugging assistance.

BACKGROUND ART

Making a systems operation in accordance with an environment unique to a user has been increasingly needed along with widespread usage of operation target systems such as domestic and overseas data centers and cloud environments. In a service such as making a systems operation, a component-set whole process including a plurality of components each having a defined execution order may be produced. In the present specification, a "component" is a significant processing module as a set of one or more (typically, a plurality of) of processing steps and independent of any other component. Thus, a component (set of processing steps) is self-contained significant processing having no dependent relation with any other component. For example, a component corresponds to one task, and a component-set whole process includes a plurality of tasks. Accordingly, the component-set whole process (for example, a service) has a size larger than that of processing (for example, a service) as one task and takes a longer time between the start and end of execution.

In typical computer program production, debugging is performed to verify whether a produced computer program normally operates. It may be desirable to perform debugging on the component-set whole process like the typical computer program production.

PTL 1 discloses a debugging assistance technology that input values requested by a program are stored in advance in an order in which processing of the program proceeds, and automatically input up to arbitrary processing at debugging.

CITATION LIST

Patent Literature

[PTL 1] Japanese Patent Laid-Open No. H6-139108

SUMMARY OF INVENTION

Technical Problem

However, the debugging assistance technology disclosed in PTL 1 cannot be applied to debugging assistance of a component-set whole process. This is because of first and second problems described below.

The first problem is as follows. When a program is to be verified with some changed input values, all input values need to be stored in an order in which they are to be input. This is a complicated procedure. In particular, the complication of the procedure becomes significant as the size of a program increases, and thus is a serious problem because the size of the component-set whole process is larger than that of processing (service) as one task (for example, an operation target system such as a data center or a cloud environment typically has a large size).

The second problem is as follows. In the component-set whole process, each component (processing content of the component) does not depend on any other component (processing content of the other component), but an input value of a component potentially depends on an input value of the same component or any other component. In other words, input values of one component potentially depend on each other, or an output value of a component is potentially used as an input value. Thus, it is difficult to understand which input value depends on which input value, for all input values available for the component-set whole process. The understanding is further difficult for a user without expert-level knowledge. Thus, it is difficult to accurately perform debugging of the component-set whole process in some cases.

Solution to Problem

A computer system exports at least one of an input package and an output package for at least one execution target component to a storage resource in a test of a component-set whole process. Each input package includes an input property of a component corresponding to the input package, and each input property includes an input value. Each output package includes an output property of a component corresponding to the output package, and each output property includes an output value. The computer system imports at least one of (X1) and (X2) which are described below to a debugging target component to execute the debugging target component without executing a component an order of which precedes an order N (where N is a natural number) of the debugging target component.

The (X1) is an input value of the debugging target component in at least one of an exported input package of the debugging target component and an exported output package of a component the order of which is an order (N−1).

The (X2) is an input value of the debugging target component, which is updated by a user, in at least one of the exported input package of the debugging target component and the exported output package of the component an order of which is the order (N−1).

Advantageous Effects of Invention

A user does not need to input any input value of a component having an order before that of a debugging target component to perform debugging, but only needs to input an input value necessary for the debugging target component (for example, an input value changed by the user and an input value that potentially depends on the input value). This achieves high debugging efficiency.

A component is a significant processing module as self-contained processing. An input value is stored in units of components. This allows a user to easily understand meaning of an input value. In addition, since a component does not depend on any other component, the user can easily understand any influence of input value change on another component (for example, a subsequent component receiving, as an input value, an output value from a component, an input value to which is changed). Accordingly, any user without expert-level knowledge can easily perform debugging of the component-set whole process.

BRIEF DESCRIPTION OF DRAWINGS

FIG. 12 illustrates the configuration of a component management table.

FIG. 13 illustrates the configuration of a component property management table (component 3).

FIG. 14 illustrates the configuration of a component property management table (component 4).

FIG. 15 illustrates the configuration of an export-import property table.

FIG. 16 illustrates the configuration of a service maintenance property table.

DESCRIPTION OF EMBODIMENTS

The following describes an embodiment. The embodiment described below is not intended to limit the invention according to the claims, and not all elements and combinations thereof described in the embodiment are necessarily essential to the solution of the invention.

In the following description, information is given in the expression of a "kkk table" but may be expressed in a data format other than a table. At least one of "kkk tables" may be referred to as "kkk information" to indicate independence from a data format. The configuration of a table is exemplary, and thus two or more tables may be combined into one table, or one table may be divided into a plurality of tables.

In the following description, a "program" is the subject of description of processing in some cases. However, the subject of processing may be a processor (such as a central processing unit (CPU)) because a program is executed by the processor to perform predetermined processing using, for example, a storage resource (such as a memory) and/or a communication interface device (such as a communication port) as appropriate. Processing described with a computer program as a subject may be performed by a processor or an apparatus including the processor. A processor may include a hardware circuit configured to perform part or all of processing. A program may be installed from a program source to each controller. The program source may be, for example, a program distribution computer or a computer-readable storage medium.

In the following embodiment, there are—a first computer system (hereinafter referred to as an operation management system) which manages an operation target system, and a second computer system (hereinafter referred to as an operation automation system) which assists system operation automation. However, the operation management system and the operation automation system may be one computer system. The operation management system may be included in an operation target apparatus.

In the following description, a computer system may include one or more computers. Specifically, for example, when a computer displays information (specifically, the computer displays information on an own display device or the computer transmits display information to a remote display computer), the computer is a computer system. In the present embodiment, the operation automation system or a management server in the system is an exemplary computer system, and a management client in the operation automation system is an exemplary display computer.

In the following description, identification information of an element is expressed in a "uk (unique key)" or a "key name", but any different kind of identification information (for example, a number) may be used in place of or in addition to at least one of these expressions.

Figure 1:
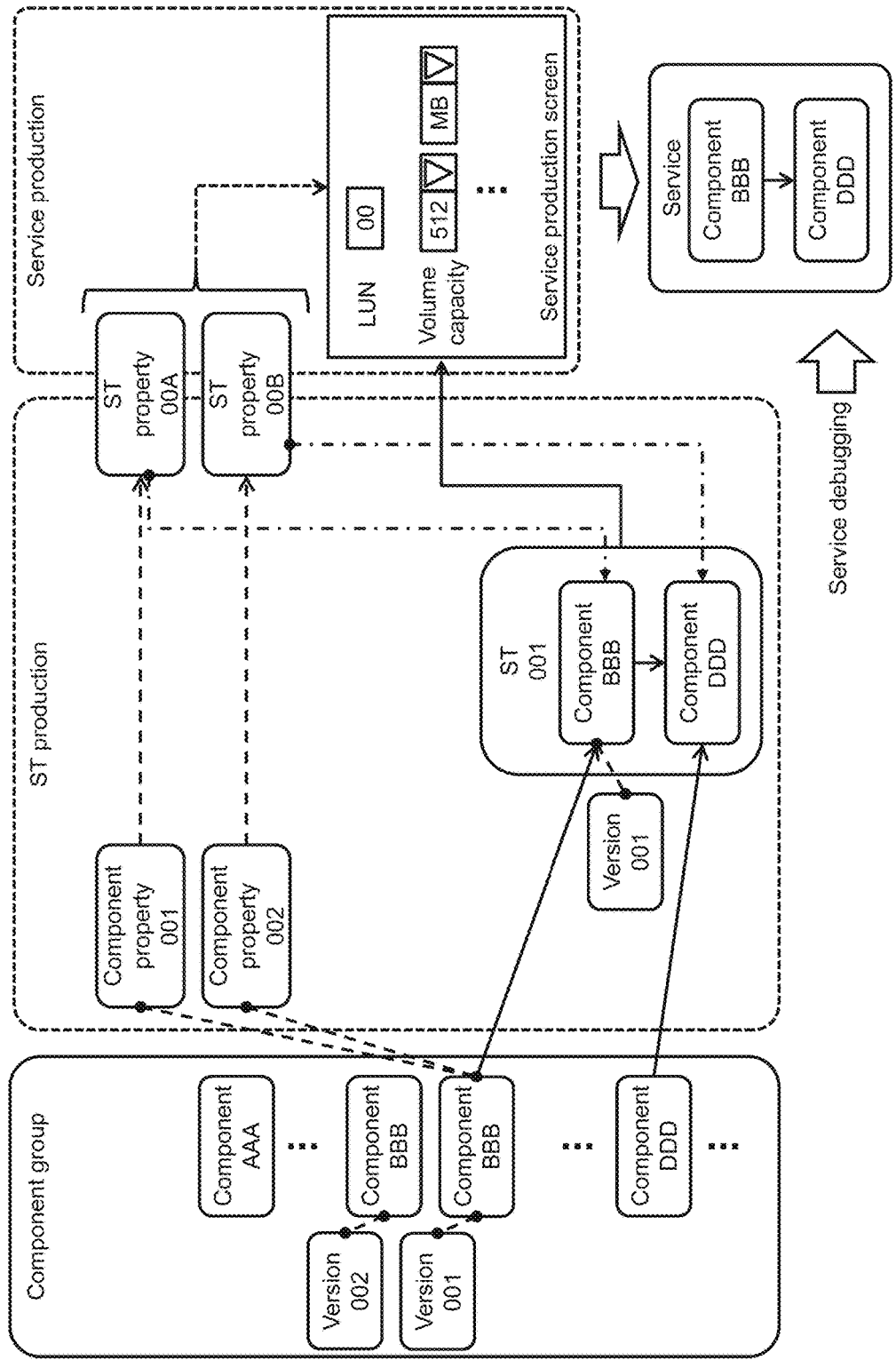
FIG. 1 illustrates the outline of an embodiment.

FIG. 1 illustrates the outline of the embodiment.

The operation automation system manages a large number of components for system operation. The "system operation" refers to operation of a computer system. A "component" is a significant processing module as a set of one or more (typically, a plurality of) processing steps and independent of any other component. Thus, a component (set of processing steps) is self-contained significant processing having no dependent relation with any other component. In other words, a component is one piece of independent processing (task). A component may be any one unit associated with a service template (hereinafter referred to as an ST) to be described later. Components include a plug-in component and an ST component (service template handled as a component), which will be described later in detail.

The plug-in component is, for example, a processing module which executes a script, and may be an execution file. The plug-in component is provided to the operation automation system in advance, but the present invention is not limited thereto. The plug-in component may be added to the operation automation system later. The plug-in component may be, for example, a component which causes to execute changing the configuration of a storage apparatus (for example, create a logic volume therein), but the present invention is not limited thereto. The plug-in component may be, for example, a component used to combine components or a component usable in a general-purpose manner. Examples of the plug-in component include a software component, a file forward component, and a file execution component for repetitive execution.

For example, a component is externally added (downloaded) to the operation automation system, a component is produced or improved by a user of the operation automation system, or an ST is set as a component, but a component may be added by other manner in the operation automation system. Examples of the improvement of a component include at least one of (1) correction of failure inside the component, (2) improvement of an internal processing efficiency, (3) change of an apparatus as an operation target of the component (for example, required change of a component which executes a command for management of the apparatus due to change in specification of the command), (4) increase in the number of apparatuses as operation targets of the component (for example, a new apparatus of a second vendor can be operated in addition to an apparatus of a first vendor), (5) change in the number of input/output properties of the component, (6) change of the format of values given to input/output properties of the component, (7)

change or addition of a default value associated with the component, and (8) increase of processing executable as the component or improvement of processing efficiency.

The operation automation system manages a large number of components. In the present embodiment, an ST is produced based on two or more components of a large number of components, a service is produced based on the produced ST, and the produced service is executed (provided). In the present embodiment, for example, a test of a service is performed before execution of the service (provision of the service), and debugging of the service is performed in the test. The following describes the outlines of component management, ST production, ST confirmation, service production, service execution, and service debugging.

<Component Management>

The operation automation system manages a large number of components. A component may be added or edited by a component providing user. The operation automation system manages one or more component properties associated with each component. The operation automation system manages the version of each component. FIG. 1 illustrates the component property and version of Component BBB as an example, but any other component is associated with the component property and version of the other component.

A "component property" refers to a property of a component. Two kinds of properties, a component input property and a component output property, are provided as component properties. The component input property is related to inputting of a value (input value) of a defined item (display name). The component output property is related to outputting of a value (output value) of a defined item (display name). One component is associated with at least one of one or more component input properties and zero or more component output properties. In other words, some component is associated zero output property, but the component is always associated with one or more input properties. The input value may be, for example, copy of a value input as a property of a service produced in the past or copy of a value output for an executed other component. The output value may be, for example, configuration information after component execution.

Component BBB of Version 001 and Component BBB of Version 002 are individually managed. In other words, any identical components having different "versions" are handled as different components. Specifically, when a component is updated (improved, for example), the component after the update is not overwritten to the component before the update but is managed separately from the component before the update. When the component is updated such that the component before the update is automatically replaced with the component after the update like software update, trouble could occur to operation automation. In particular, when the component before the update is an element of an already produced service, trouble is likely to occur. To avoid this trouble, when a component is updated in the present embodiment, the operation automation system sets a first kind of identification information (for example, a component name) of the component after the update to be same as a first kind of identification information of the component before the update, but sets at least one of the version of the component after the update and second identification information (for example, a component unique key (component uk)) thereof to be different from the version or second identification information of the component before the update. In this manner, the operation automation system can manage the component after the update as a component different from the component before the update.

The "component providing user" is a user of the operation automation system who performs, for example, addition or update of a component. The component providing user can perform production, addition, update, and the like of a component through, for example, a graphical user interface (GUI), a common language infrastructure (CLI), an application programming interface (API), and the like. A component added or updated by the component providing user may be typically a plug-in component. An ST can be associated with any of a plug-in component and an ST component. The plug-in component may be of a minimum unit, and the ST component may be a package of one or more plug-in components and an ST associated therewith. The plug-in component may include a component input property and a processing content to be executed based on an input value input to the component input property. The ST component may include a component input property and a processing content to be executed based on an input value input to the component input property. The component input property of the ST component may be an ST input property to be described later.

<ST Production>

The operation automation system displays an ST production screen. An information input UI is displayed in the ST production screen. An ST production user inputs information to the ST production screen through a user operation. For example, the operation automation system receives selection of two or more components of a large number of components and specification of an execution order of the two or more components through the ST production screen. The operation automation system produces an ST of a service flow based on the two or more selected components and the specified execution order.

The "ST production user" is a user of the operation automation system who produces an ST. As described above, the ST production user produces an ST through the ST production screen. The ST production user may be same as or different from the component providing user. The above-described ST component may be typically a component of an ST produced by the ST production user and verified. However, the ST component may be produced by another vendor or user.

The "user operation" is an operation performed on a screen by a user through an input device. The input device used for the user operation is typically a combination of a pointing device (for example, a mouse) and a keyboard, or a touch screen. Inputting through the screen is performed through the user operation.

An "ST" is a service template. In the present embodiment, an ST is abbreviated as "ST" in some cases. An ST may be explained as an object indicating an automated execution content that is not instantiated.

The "service flow" is typically the arrangement of two or more selected components. The arrangement of components follows a specified execution order. When the number of selected components is one, the number of components included in the service flow is one.

As described above, the operation automation system produces an ST based on two or more components selected through the ST production screen and a specified execution order thereof. Specifically, for example, the operation automation system produces a plurality of ST properties (for example, ST properties 00A and 00B) corresponding to a plurality of respective component properties (for example, component properties 001 and 002) associated with the two or more selected components, and associates the produced ST properties with an ST (for example, ST 001). An ST property corresponding to a component property is automatically produced by the operation automation system based on the component property. The ST property may include a value input through a user operation during or after production of the ST property, but may be produced without inputting through a user operation (that is, manual inputting). An "ST property" is a property of an ST. Two kinds of properties, an ST input property and an ST output property, are provided as ST properties. The ST input property is related to inputting of a value of a defined item (display name), and the ST output property is related to outputting of a value of a defined item (display name). One ST is associated with at least one of one or more ST input properties and zero or more ST output properties. In other words, one ST is not always associated with at least one ST output property.

In the example illustrated in FIG. 1, the service flow includes a combination of Component BBB "Provisioning volume" (production of a logical volume in a storage apparatus) and Component DDD "Create pair volume" (production of a logical volume (secondary volume) to be paired with the logical volume (primary volume)), and an ST (ST 001) of the service flow is produced.

<ST Confirmation>

When having received confirmation of a produced ST through a user operation, the operation automation system manages the ST type of the produced ST as "Release". The ST type of "Release" indicates that the ST has been confirmed and a service can be produced based on the ST. When yet to be confirmed, the ST has the ST type of "Debug". The ST type of "Debug" indicates that the ST is being edited. The operation automation system may be configured not to receive selection of an ST having the ST type of "Debug" (for example, not to display an ST having the ST type of "Debug" as selectable (disable)) during service execution. For example, a service production user to be described later may be allowed to produce a service only for an ST having the ST type of "Release", and an ST production user, who needs to perform a test, may be allowed to produce services for STs having the ST types of "Release" and "Debug". To achieve such processing, the operation automation system performs user recognition. An ST and a service can be both debugged in similar manners, but the present embodiment exemplarily describes service debugging only.

<Service Production>

The operation automation system manages a produced ST. The operation automation system receives selection of any ST having the ST type of "Release" from the service production user and displays a service production screen based on the selected ST. The service production user inputs information to the service production screen through a user operation. The operation automation system produces a service based on the information input through the service production screen.

The "service production user" is a user who produces (executes) a service. The service production user and the ST production user may be different users or an identical user.

A "service" is an instantiated ST. Specifically, an ST has a blank for a value necessary for service execution, but becomes a service when the necessary value is input. A default value of the value necessary for service execution can be set by property information of the ST in some cases.

A service is also referred to as an "operation service" to indicate a relation of the service with operation. In a particular situation, a "service" represents operation processing to be performed on an operation target apparatus specified by a user. For example, this representation is applied to a case in which ST input property 1304C is specified in the example illustrated in FIG. 5. When specified operation target apparatus information (information indicating an operation target apparatus) is embedded in a component or when no operation target apparatus information is provided as the default value of an input property of a component, the relation between a "service" and an "ST" can be understood as follows: an operation target apparatus, the configuration of which is to be changed or from which information is to be acquired, is clearly specified in a processing content indicated by a "service" through specification of an input value, but not in an "ST".

The operation automation system may associate a produced service with a service property. A "service property" is an input/output property (at least one of input and output properties) of a service. At least one of a value input to an ST in service production and a value output from a component in service execution is configured to be the input/output property of a service. Specifically, for example, in execution of a service, a value input to the input property in service production may be input to a component associated with an ST for the service, and processing may be executed. In addition, a value output from a component may be configured to be the output property of a service, and the configured value (for example, configuration information after the component is executed) may be displayed on an execution result screen for the service.

<Service Execution>

The operation automation system transmits a command for execution of a produced service to the operation management system. The operation management system executes the service in accordance with the command.

<Service Debugging>

For example, a test of a service is performed before execution of the service. In the test, the operation automation system executes a service debugger to perform debugging of the service. Specifically, the operation automation system exports at least one of an input package and an output package for at least one execution target component. The input package includes all input values of the corresponding component, and is, for example, an input property file. The output package includes all output values of the corresponding component, and is, for example, an output property file.

The operation automation system imports any corresponding input value of an exported file to a debugging target component. The input value is, for example, at least one kind of the following input values (a) to (c).

(a) Input value in the input package of the debugging target component.
(b) Output value in the output package of a component right before the debugging target component, which is an input value for the debugging target component.
(c) Value obtained by changing at least one of the values (a) and (b) by a user (for example, a service production user).

No input value needs to be input to any component before the debugging target component, and thus, debugging efficiency is high, and any influence of change of an input value can be easily understood because of no dependency of a component (processing content 9 on another component (processing content), thereby facilitating debugging.

Procedure (Q) is employed in service debugging according to the present embodiment, but Procedure (P) may be employed in place of Procedure (Q). In other words, at least one of an input package and an output package is exported for at least one execution target component, but the "at least one execution target component" may be only a component selected as a debugging target component or may be each component executed in service execution.

(P) In service execution for the first time, at least one of an input package and an output package is manually (or automatically) exported for each executed component. Thereafter, a debugging target component is selected by a user from among a plurality of components included in a service. An input value exported for the selected component (debugging target component) is imported to the component.

(Q) Before service execution for the first time, a debugging target component is selected by a user from among a plurality of components included in a service. At least one of an input package and an output package is exported only for the selected component (debugging target component). Thereafter, an exported input value is imported to the component.

The above description is made on the outlines of the component management, the ST production, the service production, the service execution, and the service debugging.

The following describes the embodiment in detail.

Figure 2:
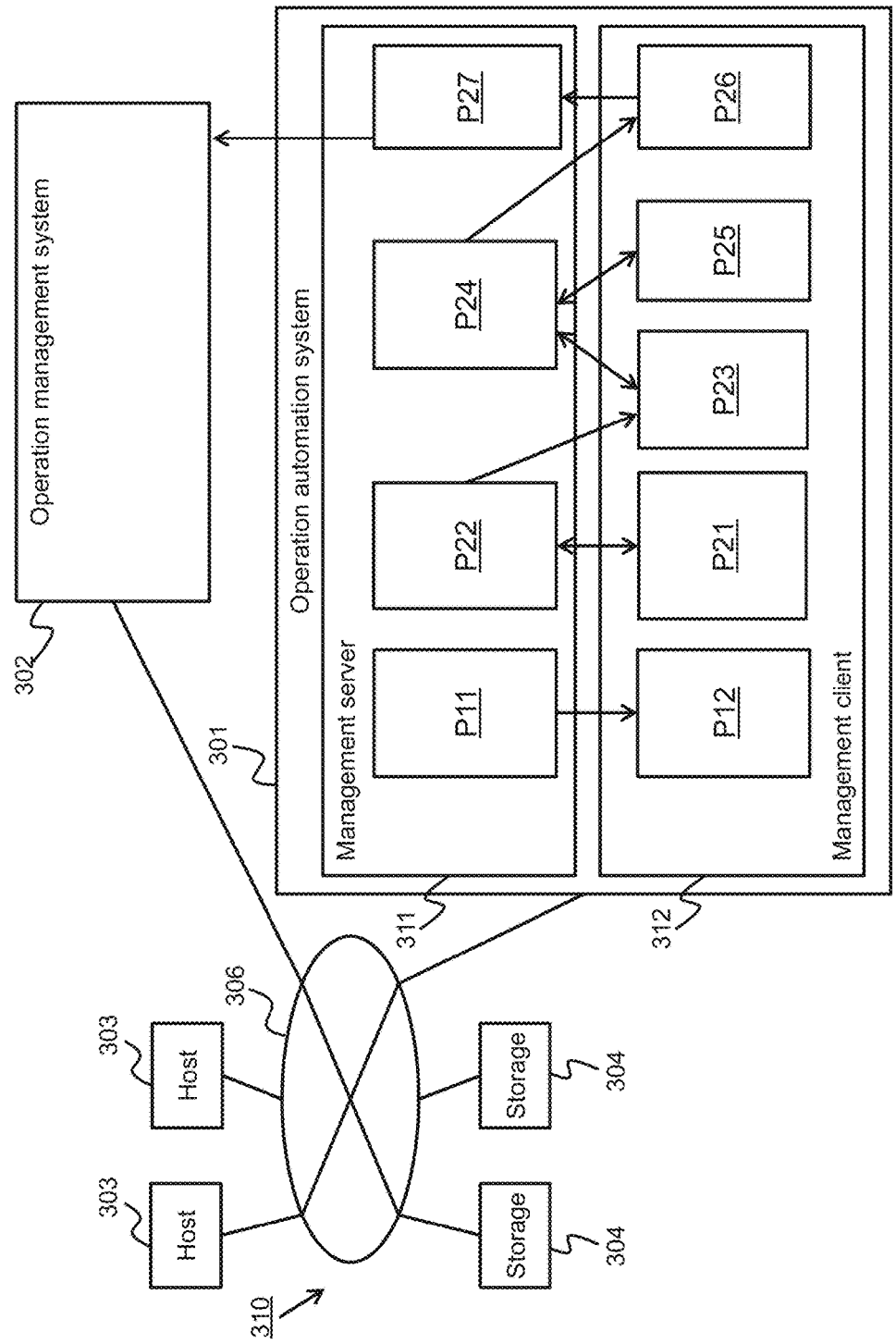
FIG. 2 illustrates the entire configuration of a system according to the embodiment.

FIG. 2 illustrates the configuration of an entire system according to the embodiment.

An operation management system is coupled to an operation target system 310, and an operation automation system 301 is coupled to an operation management system 302. The operation automation system 301 may be integrated with the operation management system 302.

The operation target system 310 includes one or more host computers (hereinafter referred to as a host) 303 and one or more storage apparatuses 304. The host 303 is coupled to the storage apparatus 304 through a communication network 306. The host 303 includes an I/F (communication interface device) coupled to the storage apparatus 304, a storage resource such as a memory, and a processor coupled to these elements. The storage apparatus 304 includes one or more PDEVs (physical storage devices), and a controller coupled to the one or more PDEVs. The controller provides the host 303 with a logical volume. The host 303 transmits an input/output (I/O) request specifying the provided logical volume to the storage apparatus 304. The controller of the storage apparatus 304 performs data I/O on the logical volume in accordance with the I/O request. I/O target data is input to or output from the one or more PDEVs which is base of an I/O destination area of the logical volume. The host 303 and the storage apparatus 304 are each an exemplary operation target apparatus.

The operation management system 302 is a management system which manages the operation target system 310. The operation management system 302 executes a service in accordance with a command from the operation automation system 301. In the service execution, for example, a logical volume is produced in the storage apparatus 304, and a secondary volume is produced in the storage apparatus 304.

The operation automation system 301 is a management system which assists system operation automation. The operation automation system 301 includes a management server 311, and a management client 312 coupled to the management server 311. The management client 312 displays information based on the display information transmitted to the management client 312 by the management server 311.

Specifically, for example, the management server 311 specifies a relation between a component and a related ST (P11), and displays a list of the related ST for each version of the component (P12). The "related ST" for a version of a component is an ST associated with the component of the version.

For example, the management server 311 displays the ST production screen (P21), and receives production (includes editing) of an ST from the ST production user through the ST production screen (P22). The management server 311 displays the service production screen based on a confirmed ST (P23). The management server 311 receives information from the service production user through the service production screen, and produces and holds a service based on the input information (P24). The management server 311 may display a screen for editing the service or a screen for debugging the service (P25), and may receive editing of the service or execute service debugging assistance. The management server 311 displays an execution screen for the produced (includes editing) service (P26). The management server 311 receives execution of the service through this service execution screen from the service production user, and transmits a command for the received execution of the service to the operation management system 302 (P27).

A processing group (one or more pieces of processing) of processing P11, P12, and P21 to P27 illustrated in FIG. 2 is performed by the processor executing a computer program group (one or more computer programs).

Figure 3:
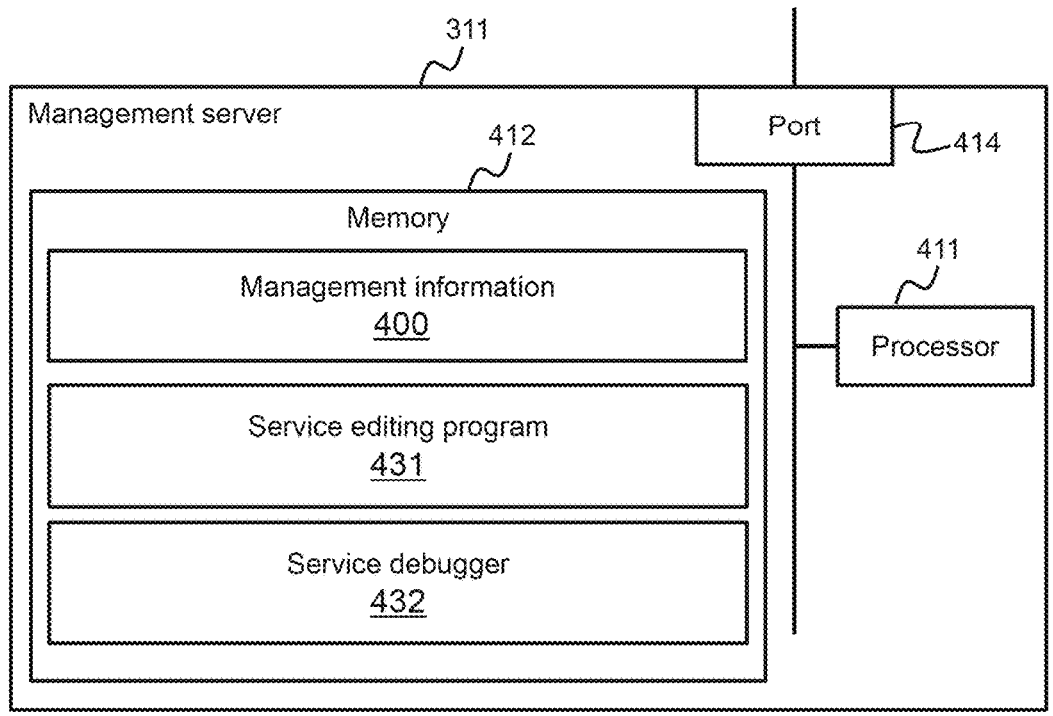
FIG. 3 illustrates the configuration of a management server.

FIG. 3 illustrates the configuration of the management server 311.

The management server 311 includes a communication port 414 (exemplary I/F), a memory 412 (exemplary storage resource), and a processor (typically, a microprocessor such as a CPU) 411 coupled to these elements. The management server 311 communicates with at least the operation management system 302 and the management client 312 through the communication port 414.

The memory 412 is not limited to a semiconductor memory but may be a hard disk drive. The memory 412 stores management information 400, a service editing program 431, and a service debugger 432. The management information 400 includes a component management table 421, a component property management table 422, an export-import property table 1500, and a service maintenance property table 1600 to be described later. The service editing program 431 performs, for example, ST production assistance and service production assistance (for example, display of the ST production screen and the service production screen). The service debugger 432 performs service debugging assistance. At least one of the service editing program 431 and the service debugger 432 may be divided into two or more program modules. The service editing program 431 and the service debugger 432 may be included in one program.

Figure 4:
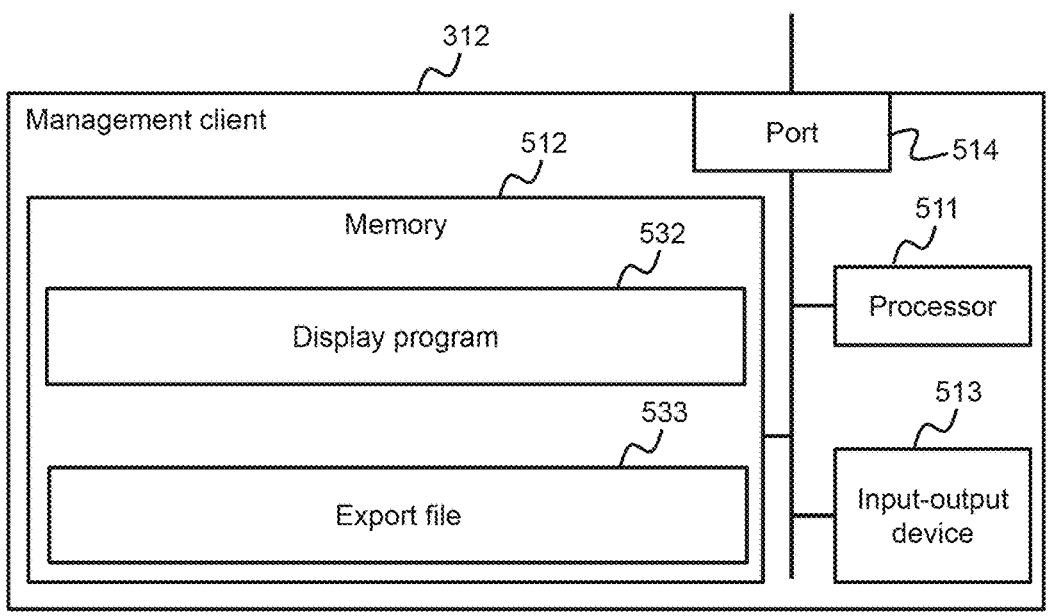
FIG. 4 illustrates the configuration of a management client.

FIG. 4 illustrates the configuration of the management client 312.

The management client 312 includes a communication port 514 (exemplary I/F), an input-output device 513, a memory 512 (exemplary storage resource), and a processor (typically, a microprocessor such as a CPU) 511 coupled to these elements.

The memory 512 is not limited to a semiconductor memory but may be a hard disk drive. The memory 512 stores a display program (for example, a web browser) 531. The memory 512 may store a file (export file) 533 exported for each service component.

Figure 5:
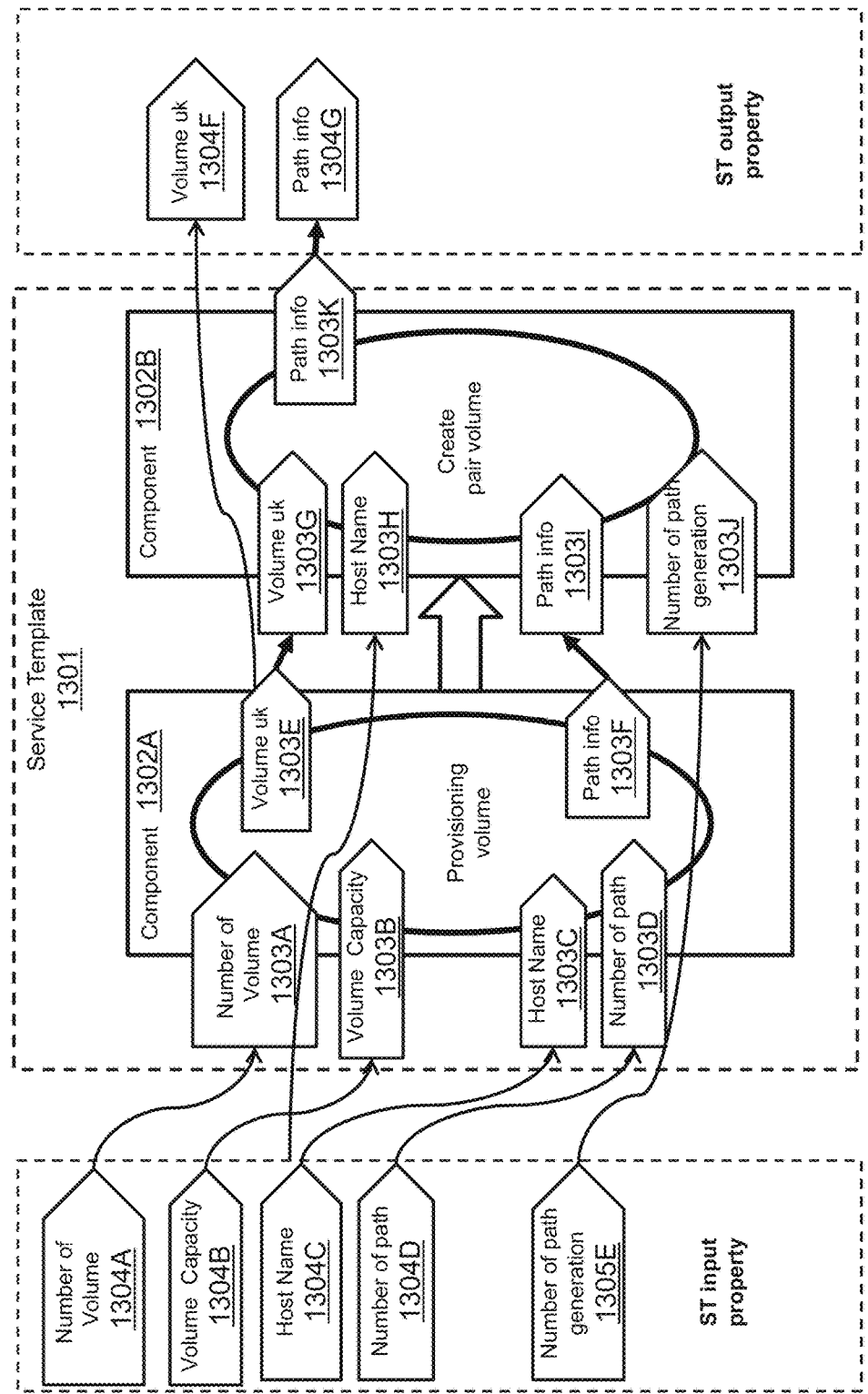
FIG. 5 illustrates an exemplary relation between an ST input property and an ST output property.

FIG. 5 illustrates an exemplary relation between ST input property and ST output property.

The service flow corresponding to ST 1301 includes Component 1302A ("Provisioning Volume") and Component 1302B ("Create pair volume"). In this service flow, the execution order is that Component 1302B is executed after Component 1302A.

Four component input properties 1303A to 1303D are associated with Component 1302A. Display names of the four component input properties 1303A to 1303D are "Number of Volume", "Volume Capacity", "Host Name", and "Number of path". Two component output properties 1303E and 1303E are associated with Component 1302A. Display names of the two component output properties 1303E and 1303F are "Volume uk" and "Path info".

Four component input properties 1303G to 1303J are associated with Component 1302B. Display names of the four component input properties 1303G to 1303J are "Volume uk", "Host Name", "Path info", and "Number of path generation". One component output property 1303K is associated with Component 1302B. A display name of Component output property 1303K is "Path info".

Among these component properties, Component output property 1303E having the display name of "Volume uk" and Component input property 1303E having the same display name of "Volume uk" have identical key names. Similarly, Component output property 1303F having the display name of "Path info" and Component input property 1303I having the same display name of "Path info" have identical key names. Accordingly, an output value from Component output property 1303E is an input value to Component input property 1303G, and an output value from Component output property 1303F is an input value to Component input property 1303I. In this manner, an output value is used as an input value for "Volume uk" and "Path info", which eliminates the need for the ST production user to input values for "Volume uk" and "Path info". This leads to prevention of wrong inputting.

In ST 1301 of the service flow, which includes the above-described components, ST input properties 1304A to 1304E are associated with ST output properties 1304F and 1304G by the service debugger 432. ST input property 1304A is an ST input property generated based on Component input property 1303A, and a display name of ST input property 1304A is "Number of Volume". ST input property 1304B is an ST input property generated based on Component input property 1303B, and a display name of ST input property 1304B is "Volume Capacity". ST input property 1304C is an ST input property generated based on Component input properties 1303C and H, and a display name of ST input property 1304C is "Host Name". ST input property 1304D is an ST input property generated based on Component input property 1303D, and a display name of ST input property 1304D is "Number of path". ST input property 1304E is an ST input property generated based on Component input property 1303J, and a display name of ST input property is "Number of path generation". ST output property 1304F is an ST input property generated based on Component output property 1303E, and thus a display name of ST output property 1304F is "Volume uk". ST output property 1304G is an ST input property generated based on Component output property 1303K, and a display name of ST output property 1304G is "Path info". These ST input properties and ST output properties are generated by the service editing program 431 based on component input properties and component output properties.

The following describes service debugging performed in the present embodiment.

Figure 6:
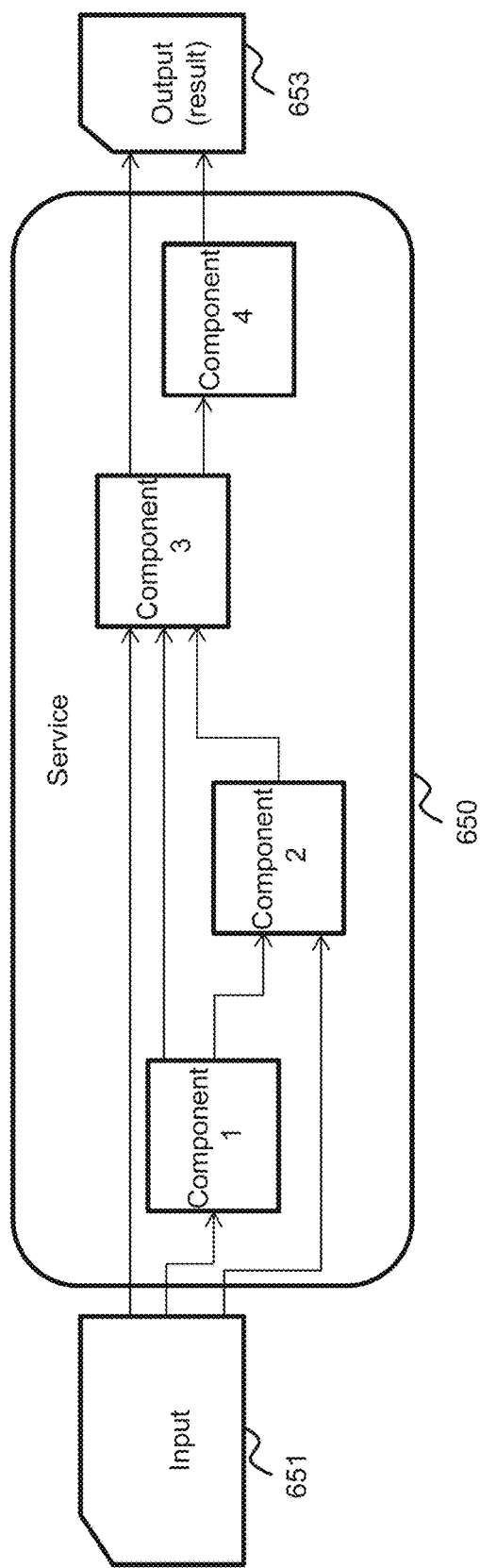
FIG. 6 illustrates an exemplary debugging target service.

FIG. 6 illustrates an exemplary debugging target service.

Service 650 includes, for example, Components 1 to 4. The flow of an arrow in FIG. 6 represents the flow of a value. The following describes premises of an execution order and the like.

Input (set of input values) 651 to Service 650 is input to Components 1 to 3. At least part of Input 651 is input to each of Components 1 to 3.

Component 1, Component 2, Component 3, and Component 4 are executed in this order. Specifically, at least part of the input values of Input 651 are input to Component 1, and output values are output from Component 1. At least part of the output values from Component 1 and at least part of the values of Input 651 are input to Component 2 as input values. Output values are output from Component 2. At least part of the output values output from Component 1, at least part of the output values output from Component 2, and at least part of the values of Input 651 are input to Component 3 as input values. Output values are output from Component 3. At least part of the output values output from Component 3 are input to Component 4 as input values. Output values are output from Component 4. Accordingly, Output 653 as an execution result of Service 650 includes at least part of the output values output from Component 3 and at least part of the output values output from Component 4.

According to the above-described premises, when Component X the execution order of which is the execution order N (where N is a natural number) is used as a reference, a component the execution order of which is the execution order "N−1" is a component right before Component X, and a component the execution order of which is the execution order "N+1" is a component right after Component X. Two or more components the execution orders of which are the same execution order, depending on definition of the execution order of a plurality of components. For example, in a service in which an output value from Component A is input to Components B and C, and output values from Components B and C are input to Component D, the order of Component A is "1", the orders of Components B and C are "2", and the order of Component D is "3".

In the present embodiment, in execution (test) of Service 650, the service debugger 432 may export, to a storage resource (that may include an external storage apparatus) such as the memory 412, at least one of an input package (typically, a package including an input value to every component) and an output package (typically, a package including an output value from every component) for at least one execution target component in Service 650. The service debugger 432 may transmit, for display or the like, an export file which is a file including the exported package to the management client 312. The memory 512 of the management client 312 may store an export file 533 from the service debugger 432.

The input property file is an exemplary input package. The input property file includes an input property of the corresponding component. Each input property includes a property value (exemplary input value).

The output property file is an exemplary output package. The output property file includes an output property of the corresponding component. Each output property includes a property value (exemplary output value).

Figure 7:
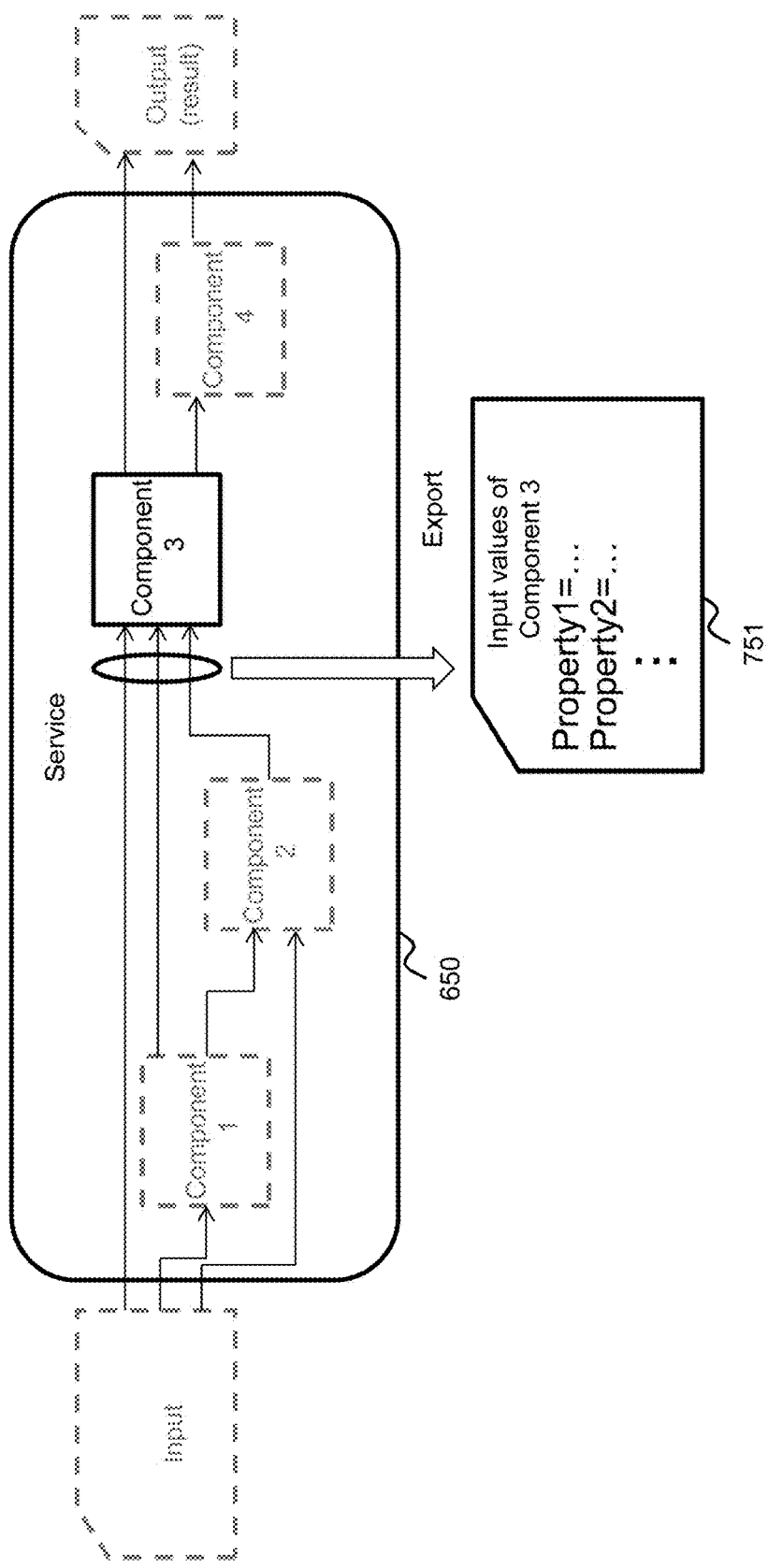
FIG. 7 illustrates first exemplary export of an input package.

FIG. 7 illustrates first exemplary export of an input package.

In the first exemplary export of an input package, the service debugger 432 exports, only for Component 3 selected as a debugging target component, an input property file 751 as an input package for Component 3 (for example, a package including all input values to Component 3) right before execution.

Figure 8:
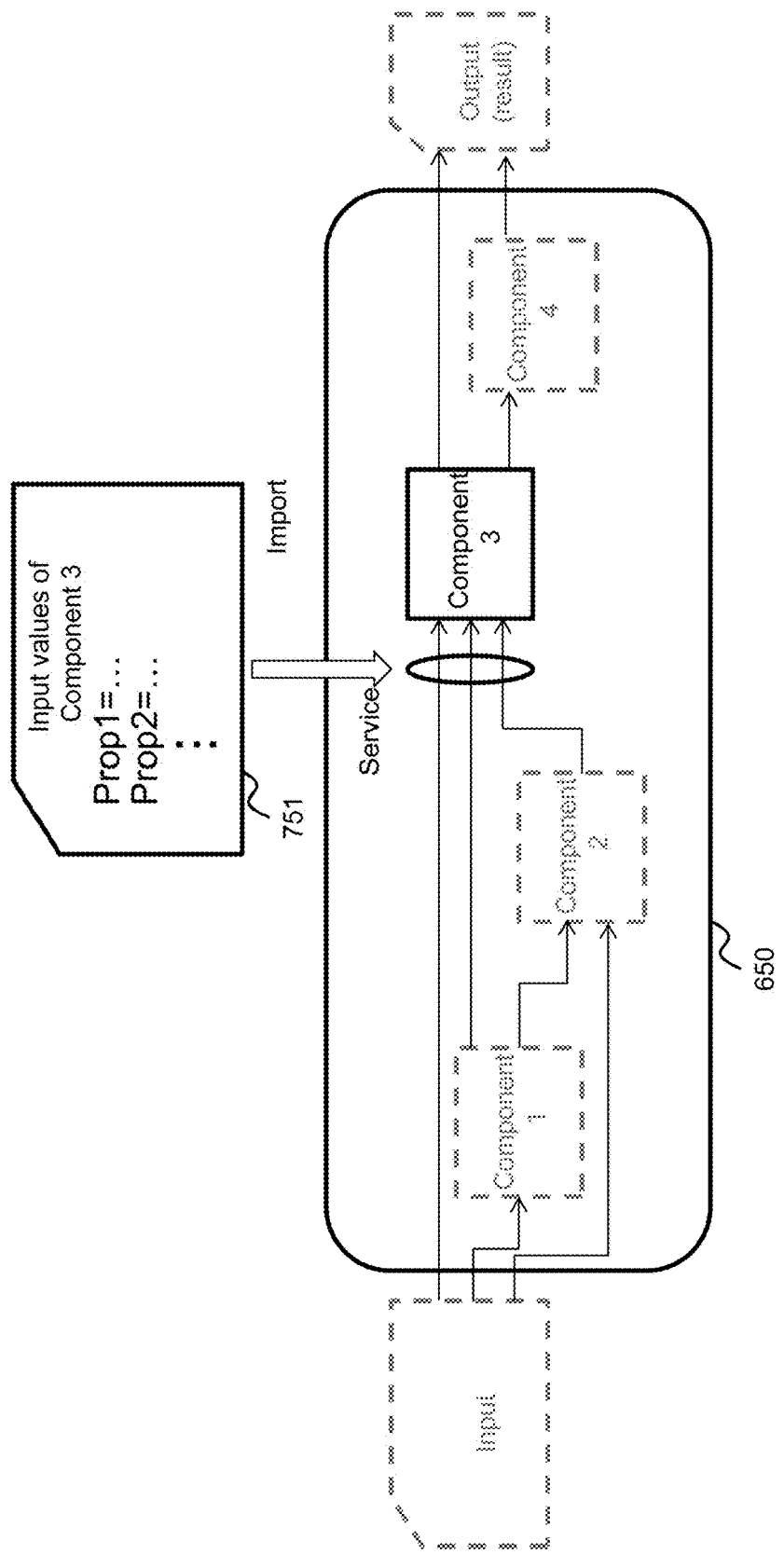
FIG. 8 illustrates first exemplary import of an input package.

FIG. 8 illustrates first exemplary import of an input package.

Any input value in the exported input property file 751 illustrated in FIG. 7 is imported to Component 3.

In this example, all input values right before execution of Component 3 can be input to Component 3 without executing any component (any of Component 1 and Component 2) the execution order of which is before that of Component 3.

Figure 9:
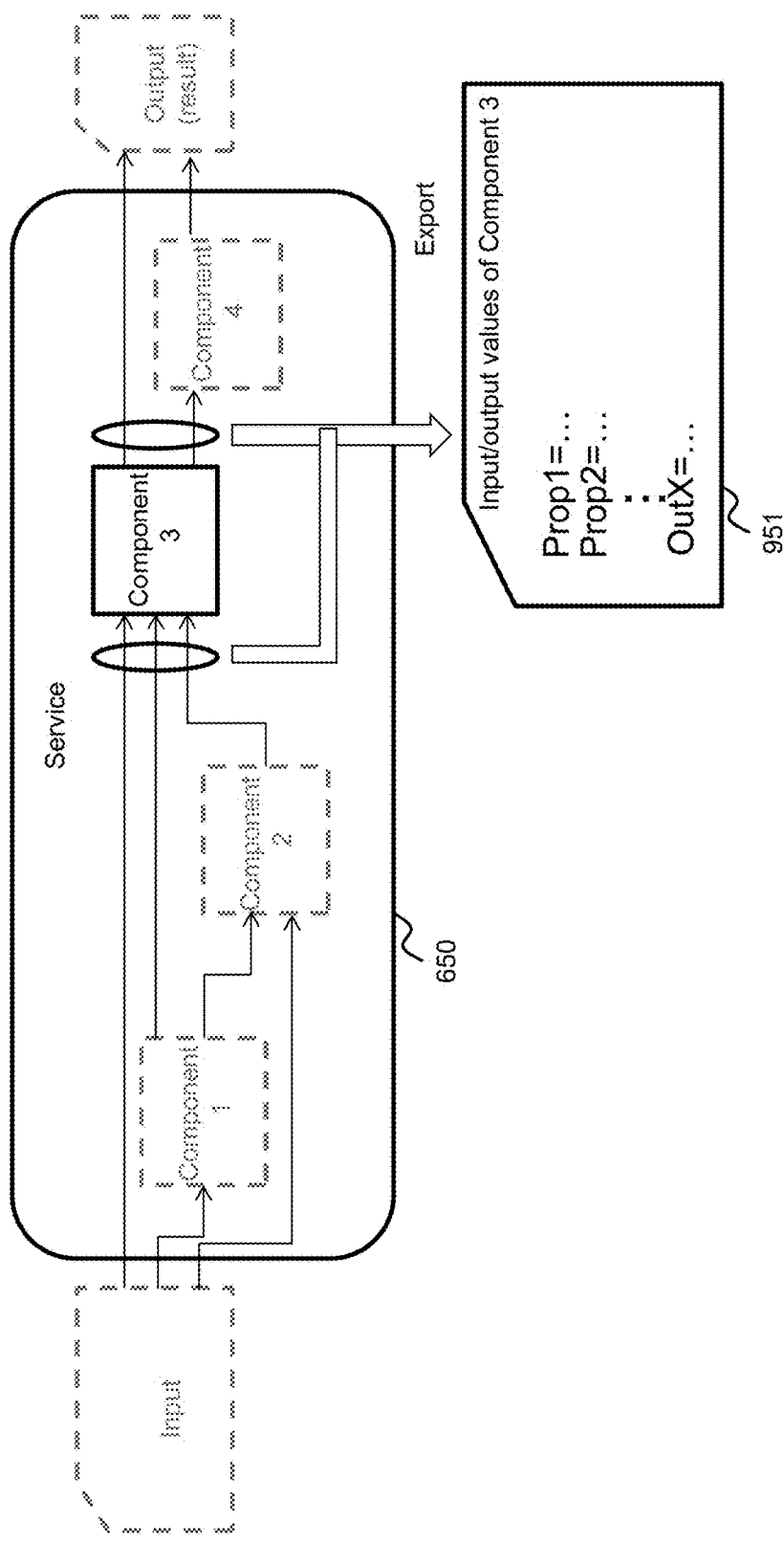
FIG. 9 illustrates second exemplary export of an input package.

FIG. 9 illustrates second exemplary export of an input package.

The service debugger 432 exports an output property file 951 including an input package that is input for execution of Component 3 and an output package for Component 3 (package including all output values from Component 3). In this manner, the input package for Component 3 is exported together with the output package for Component 3.

In this example, debugging can be performed for Component 3 again under the same condition without exporting the input package for Component 3. This allows prevention of any user mistake in operation, and allows prompt re-execution of Component 3 when an unintended value is output from Component 3.

Figure 10:
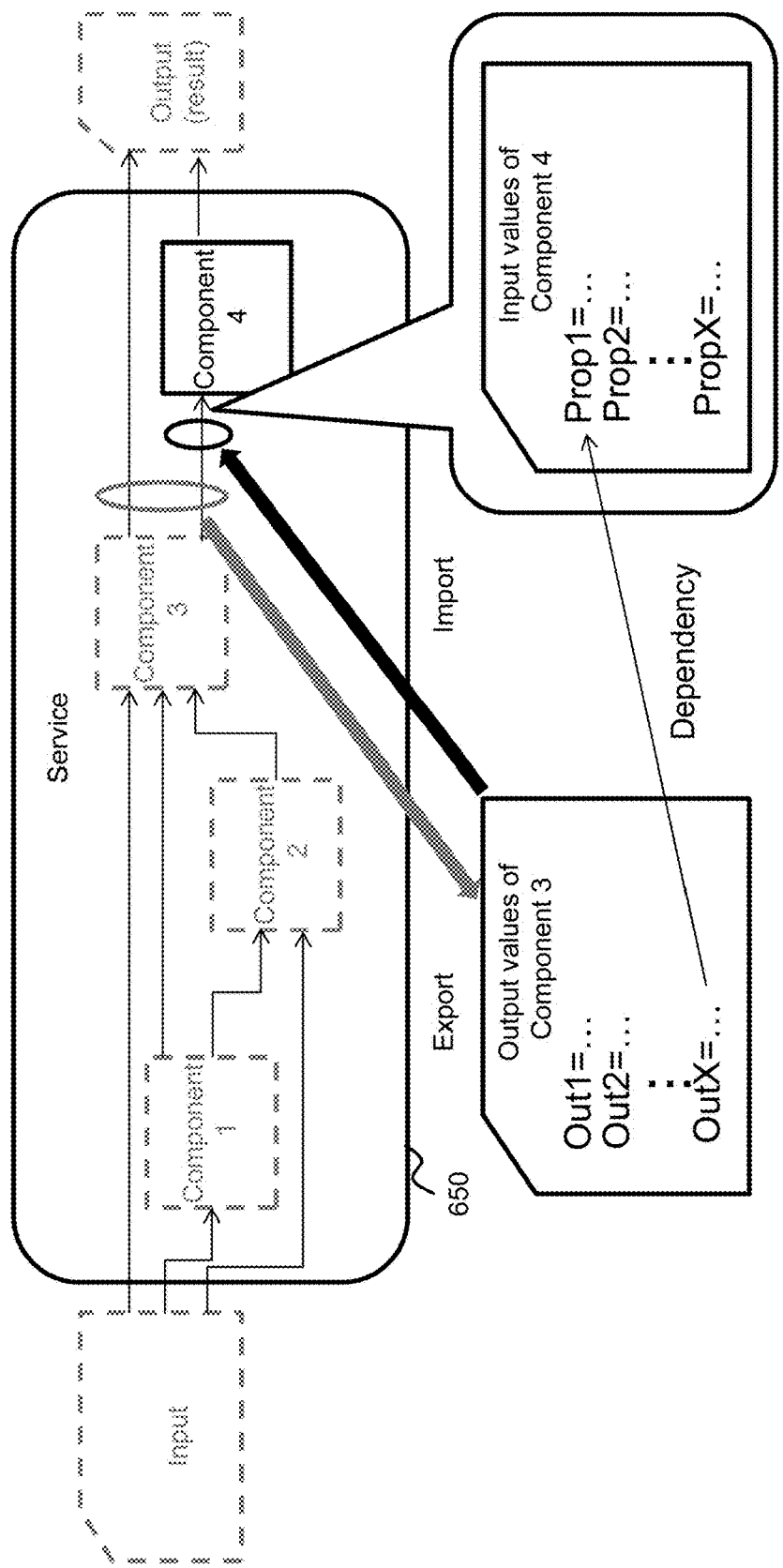
FIG. 10 illustrates second exemplary import of an input package.

FIG. 10 illustrates second exemplary import of an input package.

At least one output value in an exported output property file 1053 for Component 3 is included in an input property file 1051 for Component 4 as at least one input value to Component 4 right after Component 3. The input property file 1051 is imported to Component 4 after Component 3. Specifically, for example, an output value of Output property "OutX" of Component 3 is mapped to an input value of Input property "Prop1" of Component 4. Thus, there is dependency between the output value of Output property "OutX" of Component 3 and the input value of Input property "Prop1" of Component 4.

In this example, an input value does not need to be exported for at least one component, which leads to improved debugging efficiency.

Figure 11:
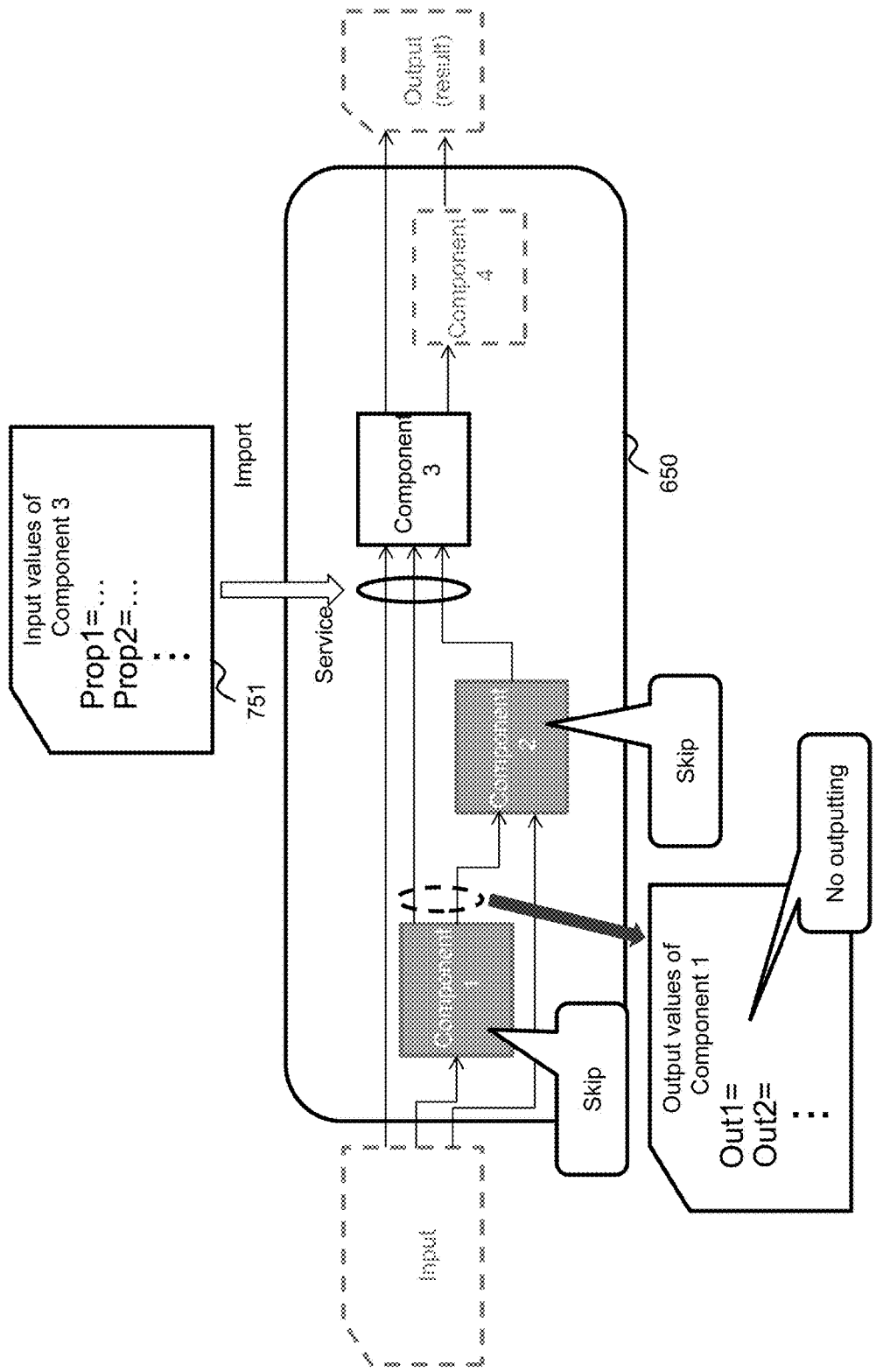
FIG. 11 illustrates the outline of debug of a debugging target component 3.

FIG. 11 illustrates the outline of debugging of the debugging target component 3.

Debugging of Component 3 can be executed without executing any component (any of Component 1 and Component 2) before the debugging target component 3. This is because a file including an input package (all input values) input to Component 3 is already exported, and an input value for Component 3 can be imported from this exported file.

In typical debugging (conventional debugging), processing needs to be executed from the start at each debugging. When this technology is applied to debugging of Service 650 (component-set whole process), components need to be executed one by one from the first component 1 of Service 650. One component corresponds to task processing such as "Provisioning volume" (production of a logical volume in a storage apparatus) or "Create pair volume" (production of a logical volume (secondary volume) to be paired with the logical volume (primary volume)) for each of a large number of logical volumes (refer to FIG. 1, for example). Thus, a significant amount of time is taken for completion of every component in some cases. This is a serious problem when debugging is executed a plurality of times.

Since none of Components 1 and 2 before the debugging target component 3 need to be executed as exemplarily illustrated in FIG. 11, the debugging efficiency improves, and as a result, a time taken for the entire service debugging (service test) can be reduced.

A "component" is a significant processing module as self-contained processing. An input value is stored in units of components. This allows a user to easily understand meaning of an input value. In addition, since a component does not depend on any other component, the user can easily understand any influence of input value change on any other component (for example, a subsequent component receiving, as an input value, an output value from a component, an input value to which is changed). Accordingly, any user without expert-level knowledge can easily perform debugging of the component-set whole process.

In a specific example of debugging, execution starts at Component 3. Specifically, for example, when having received selection of Component 3 as a debugging target, the service debugger 432 starts execution of Component 3 without execution of Component 1 and Component 2.

In another specific example of debugging, execution starts at the first component 1 of Service 650, but execution of any of Components 1 and 2 before the debugging target component 3 is skipped. Specifically, for example, the service debugger 432 may receive, from a user, selection of whether to skip execution of each of Components 1 and 2 before the debugging target component 3, and determine whether to skip execution of each of Components 1 and 2 based on the selection from the user.

For the above-described debugging, the service debugger 432 refers to the various kinds of tables in the management information 400 illustrated in FIG. 3. The following describes the configurations of the various tables in the management information 400.

FIG. 12 illustrates the configuration of the component management table 421.

The component management table 421 includes information related to a component. The component management table 421 includes a record for each component. Each record stores a component name 602, a version 603, an execution file path 604, and a component uk 605. The component name 602 is the name of a component. The version 603 indicates the version of a component. The execution file path 604 indicates a path (path name) to the execution file of a component. The component uk 605 is the unique key (number) of a component.

As understood from FIG. 12, identical components of different versions have the same component name 602 (for example, "Provisioning Volume") but have the different versions 603 (for example, "01.00.00" and "01.10.00"). Thus, identical components having different versions are managed as separate components. However, a plurality of components have the same original when the components have the same component name 602.

FIGS. 13 and 14 illustrate the configuration of the component property management table 422. Specifically, FIG. 13 illustrates a component property management table of Component 3, and FIG. 14 illustrates a component property management table of Component 4.

The component property management table 422 is provided for each component. The component property management table 422 includes a record for each component property of the corresponding component. Each record stores a component uk 701, a key name 702, a property name 703, a description 704, a mode 705, a data type 706, an input condition 707, a property value 708, an update permission 709, a mapping target 710, and necessity 711.

The component uk 701 is the uk of the corresponding component. The key name 702 is a name for uniquely specifying a component property, and is exemplary identification information of the component property. The property name 703 is the name of a component property. The description 704 is description of a component property, for example, the name of an item (information kind) to which the property value 708 (an input value or an output value) included in the component property belongs. The mode 705 indicates whether a component property is an input property ("In") or an output property ("Out") (in other words, whether the property value 708 is an input value or an output value). The data type 706 indicates the data type of the property value 708. The input condition 707 indicates an input condition of the property value 708. The property value 708 is an input value or an output value. The update permission 709 indicates whether update of a component property (the property value 708) is permitted. The mapping target 710 indicates a dependency name (mapping name) when the property value 708 (for example, an output value) is mapped to (depends on) the property value 708 (for example, an input value) of another component property. The necessity 711 indicates whether the property value 708 is essential to the corresponding component.

According to the last record in FIG. 13 and the first record in FIG. 14, the property value 708 (output value) of the key name "OutX" of Component 3 is mapped to the property value 708 (input value) of the key name "Prop1" of Component 4 (mapping target "Map1"). This indicates the mapping relation (dependency) described with reference to FIG. 10.

FIG. 15 illustrates the configuration of the export-import property table 1500.

The export-import property table 1500 is a file including at least one of exported input and output packages of a component. The export-import property table 1500 includes a record for each component property. Each record stores part of records in the component property management table 422. Specifically, each record stores a key name 1501, a property name 1502, a description 1503, and a property value 1504 (may additionally store another kind of information such as a component uk). These pieces of information 1501, 1502, 1503, and 1504 are same as the respective pieces of information 702, 703, 704, and 708 as records in the component property management table 422.

FIG. 16 illustrates the configuration of the service maintenance property table 1600.

The service maintenance property table 1600 is provided for each service. The service maintenance property table 1600 holds information related to dependency (mapping relation) between output and input values as a relation in a service. The service maintenance property table 1600 includes a record for each dependency in a service. Each record stores a key name 1601, a data type 1602, and a property value 1603.

The key name 1601 is a dependency name same as, for example, a value stored as the mapping target 710. The data type 1602 indicates the data type of the property value 1603 in the dependency. The property value 1603 is a property value (an input value or an output value) in the dependency.

The table 1600 is not necessary in some cases. This is because a data type and a property value corresponding to "Map1" can be specified based on the tables illustrated in FIGS. 13 and 14. However, the table 1600 is needed to use export of an output value from a component right before.

In service debugging, a service debugging screen is provided by the service debugger 432 and displayed by a display program 532.

Figure 17:
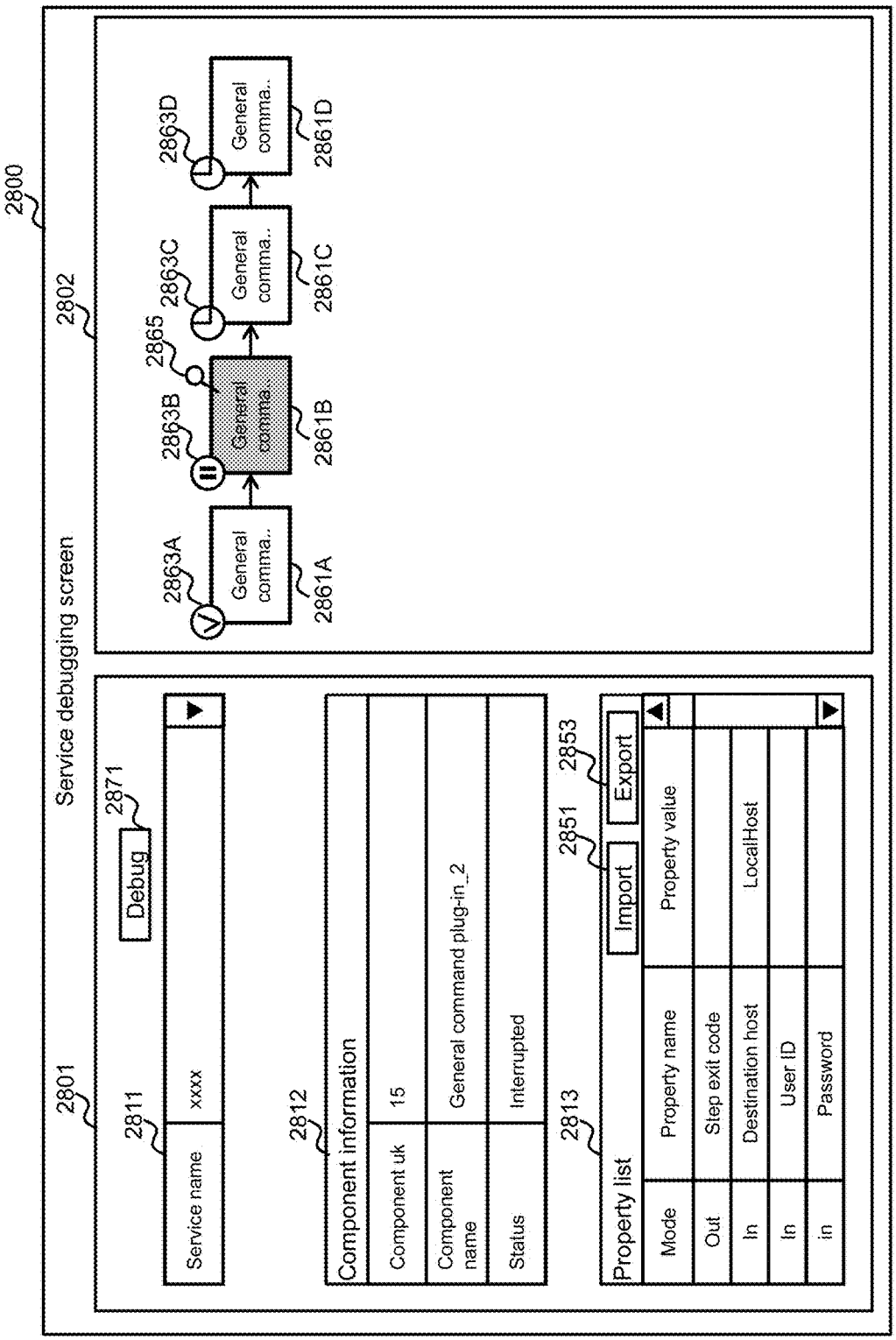
FIG. 17 illustrates a service debug screen (before import).

FIG. 17 illustrates a service debugging screen.

A service debugging screen 2800 includes a service information area 2801 and a service configuration area 2802.

In the service information area 2801, a debug button 2871, a selection user interface (UI) 2811, a component information UI 2812, and a property list UI 2813 is displayed.

The selection UI 2811 is a UI for selecting a service from among one or more produced services.

The component information UI 2812 is a UI for displaying information related to a selected component (for example, a debugging target component) in the selected service. The information related to the selected component includes, for example, the component uk 605 and the component name 602 acquired from the component management table 421 (refer to FIG. 12), and the status of the component.

The property list UI 2813 is a UI for displaying a list of information related to each component property of the selected component. The information displayed as a list includes, for example, the mode 705, the property name 703, and the property value 708 acquired for each component property from the corresponding component property management table 422 (refer to FIGS. 13 and 14). The property list UI 2813 includes an import button 2851 and an export button 2853.

The configuration of the selected service is displayed on the service configuration area 2802. Specifically, for example, when the selected service includes four components, component display objects (for example, icons) 2861A to 2861D corresponding to the respective components included in the service are displayed on the service configuration area 2802. An arrow representing an order of components is displayed between the corresponding component display objects. Marks 2863A to 2863D indicating the statuses of the respective components are displayed on the respective component display objects 2861A to 2861D.

The service debugger 432 can receive selection of a component by a user through, for example, the service configuration area 2802. The component display object 2861B corresponding to the selected component is displayed in an enhanced manner (for example, displayed in a different color).

The service debugger 432 can receive selection (specification) of a debugging target component (breakpoint) by a user through, for example, the service configuration area 2802. For example, when the second component corresponding to the component display object 2861B is selected as a debugging target component, the service debugger 432 associates the component display object 2861B with a predetermined mark (for example, a pin mark) 2865. This indicates that the component corresponding to the component display object 2861B is a debugging target component.

The service debugging screen 2800 illustrated in FIG. 17 is a screen before import is performed for a debugging target component. In an input property file exported for a debugging target component, for example, a property value corresponding to the property name "Destination host" is "AnotherHost", not "LocalHost".

Figure 18:
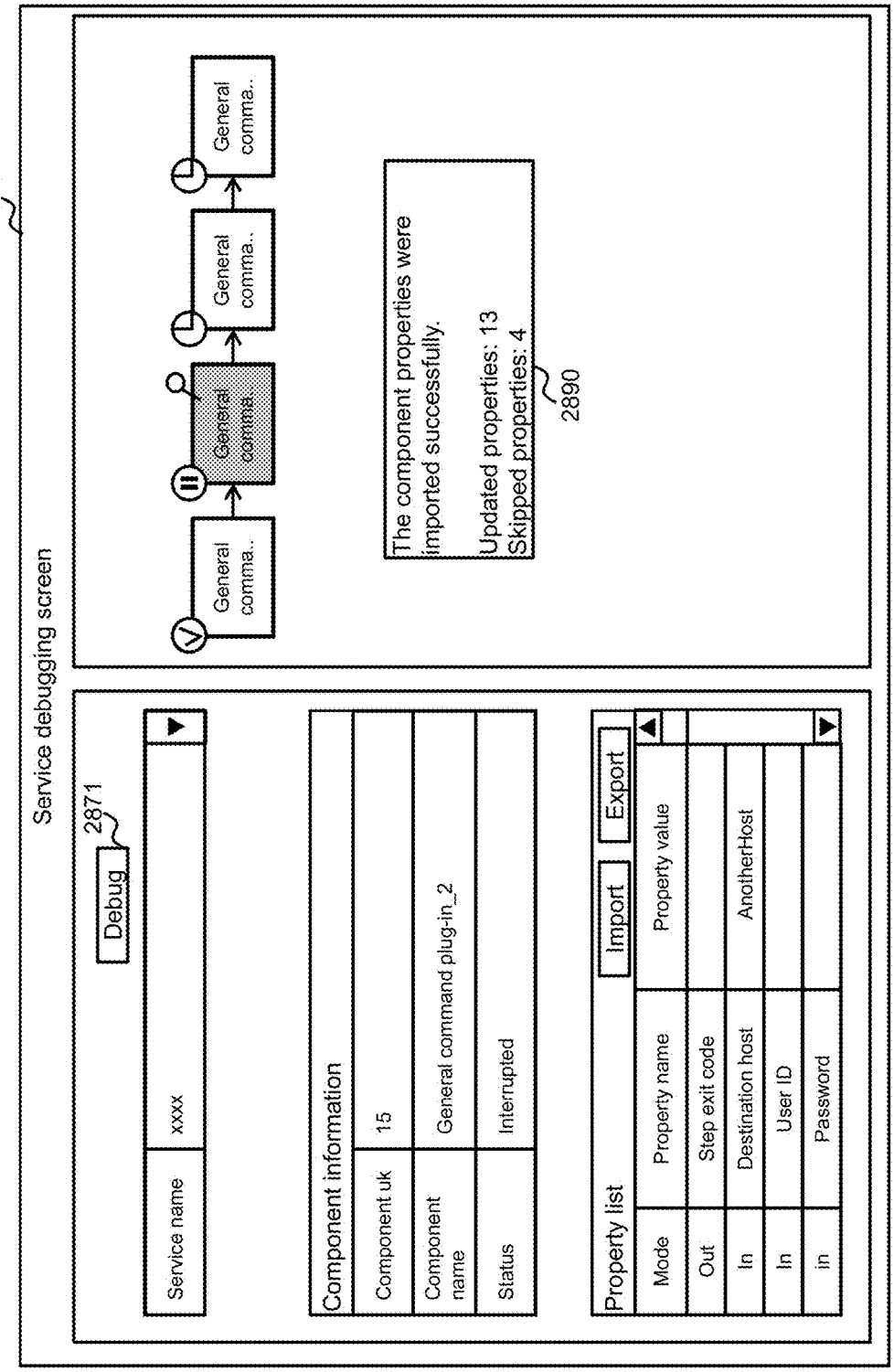
FIG. 18 illustrates a service debug screen (after import).

When the import button 2851 in the screen 2800 illustrated in FIG. 17 is pressed (when an import operation is performed), the service debugger 432 imports an input value in an input property file exported for a debugging target component. As a result, the property value (input value) of each input property before the import is updated to the property value (input value) in the imported file. Specifically, for example, as illustrated in FIG. 18, a property value corresponding to the property name "Destination host" is updated to "AnotherHost". The service debugger 432 displays a UI 2890 indicating a result of the import. The number of updated properties, and the number of properties, the update of each of which is skipped, are displayed on the UI 2890.

Thereafter, when the debug button 2871 is pressed (when an execution operation is performed on the debugging target component), the service debugger 432 executes the debugging target component by inputting the property value (input value) after the import to the debugging target component. The input value includes an input value changed by a user in some cases. At execution of the debugging target component, the service debugger 432 may export an input property file including an actual input value to the debugging target component or may export an output property file including an output value as an execution result in addition to the input value. In the present embodiment, a property file is exported manually (for example, when the export button 2853 is pressed).

Figure 19:
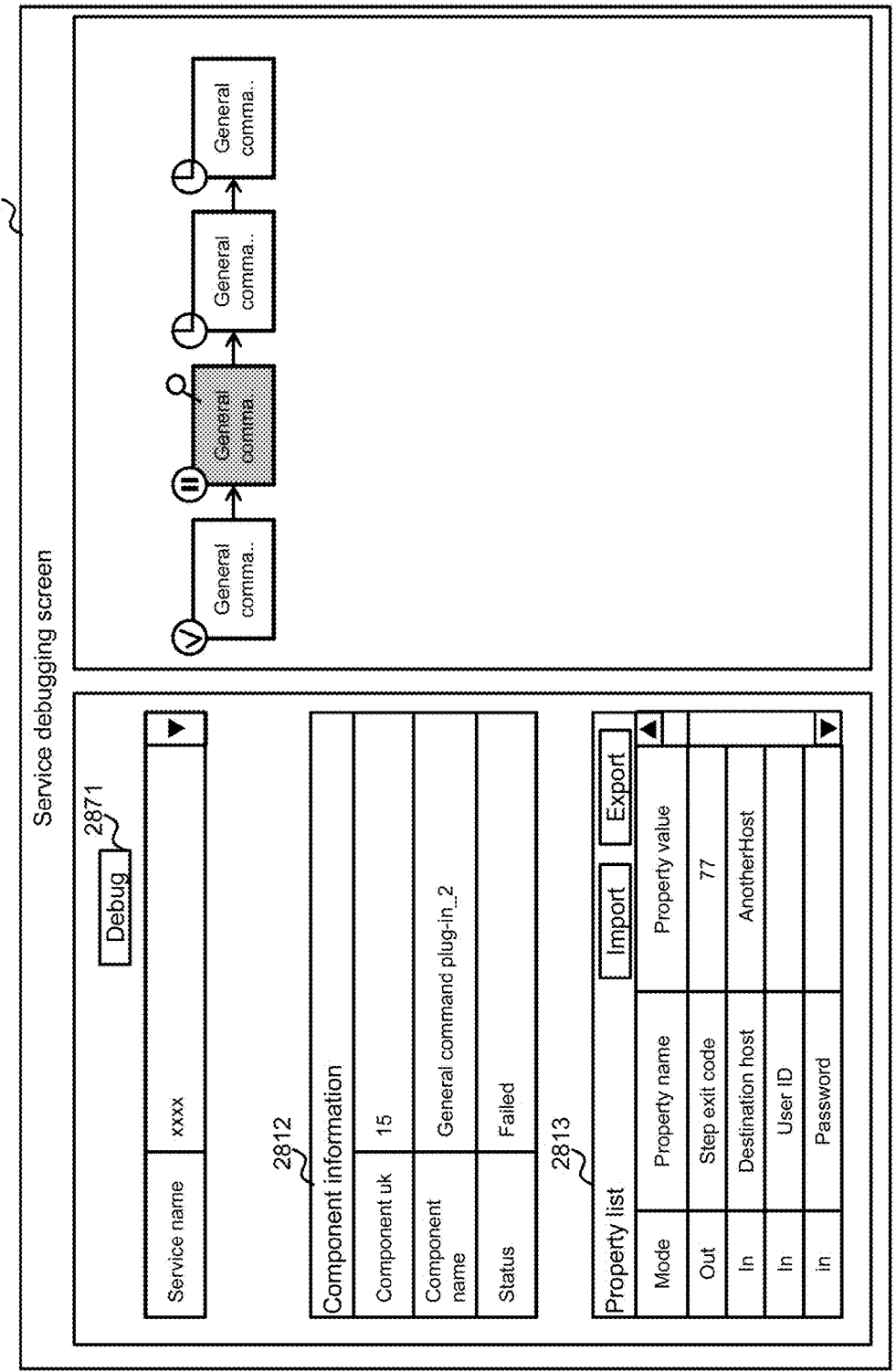
FIG. 19 illustrates a service debug screen (after execution of a debugging target component).

The service debugger 432 displays an execution result of the debugging target component. Specifically, for example, as illustrated in FIG. 19, the service debugger 432 updates a display status to "Failed" (failed execution) in the component information UI 2812, and displays an output value (property value) at a corresponding place in the property list 2813.

When the status as an execution result of the debugging target component is "Failed", the user can repeat a series of component debugging operations including the import operation (and input change (correction)) on an input value and the execution operation on the debugging target component until the status becomes "Successful" (successful execution).

The following describes processing performed in the present embodiment.

Figure 20:
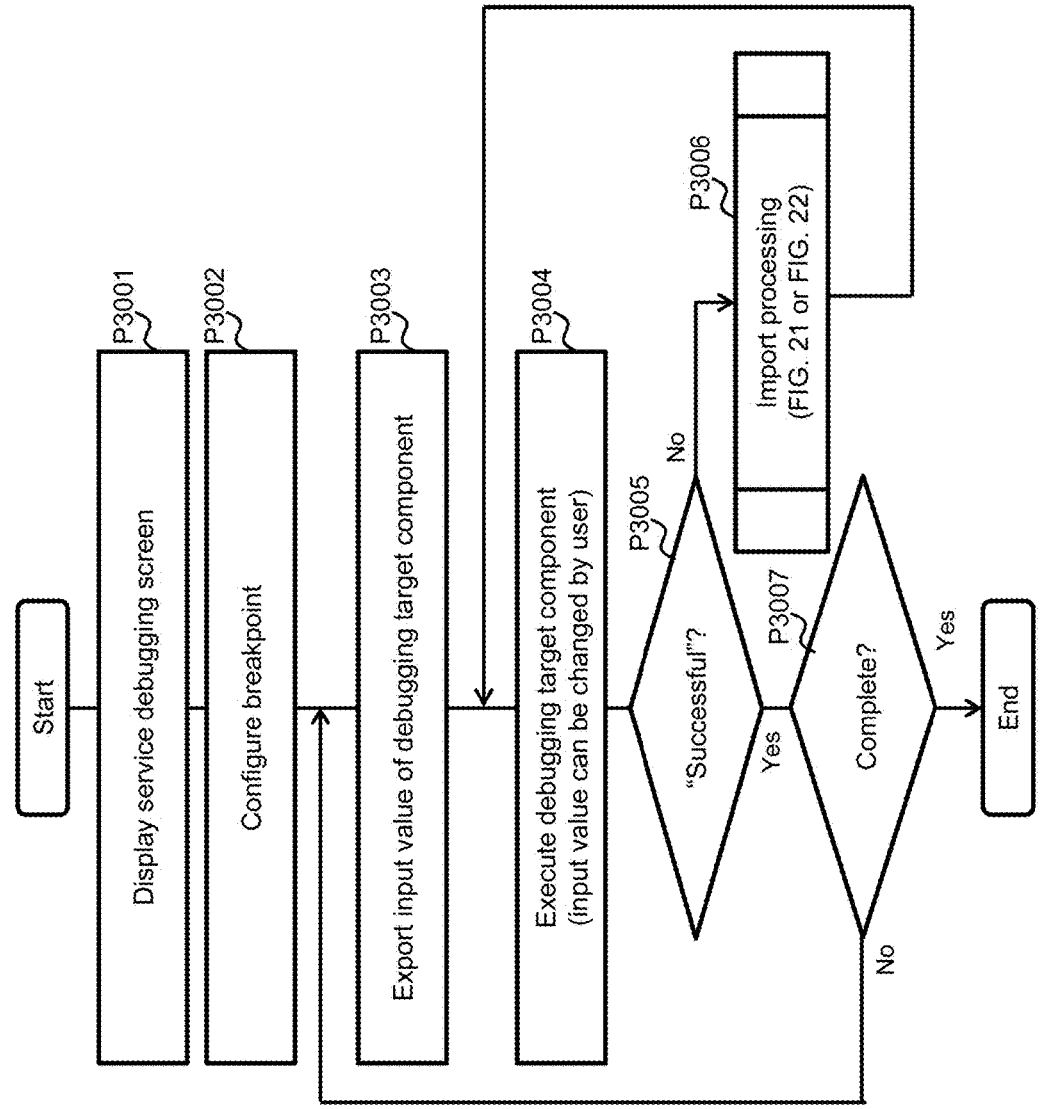
FIG. 20 is a flowchart of service debug.

FIG. 20 is a flowchart of service debugging.

The service debugger 432 displays the service debugging screen 2800 in response to a debugging start instruction from a user (P3001).

The service debugger 432 receives selection of a breakpoint for a selected service, and configures the selected breakpoint (P3002). Accordingly, one or more debugging target components are determined.

The service debugger 432 exports an input value of the selected debugging target component (P3003). An exemplary result of this export is a display content of the property list UI 2813 in FIG. 17. An exemplary output of this export is the export-import property table 1500 (refer to FIG. 15).

The service debugger 432 executes the selected debugging target component in response to a debugging target component execution operation (P3004). Before this execution, the user may change a property value in the display content of the property list UI 2813. The service debugger 432 may export a file including an input value at the execution of the debugging target component, and a file including an output value as an execution result of the debugging target component. This export may be export of a file including the input value and output value.

When a status as an execution result of the debugging target component is "Successful" (Yes at P3005), P3003 is performed when there is any other debugging target component (No at P3007), or debugging work ends when there is no other debugging target component (Yes at P3007).

Figure 21:
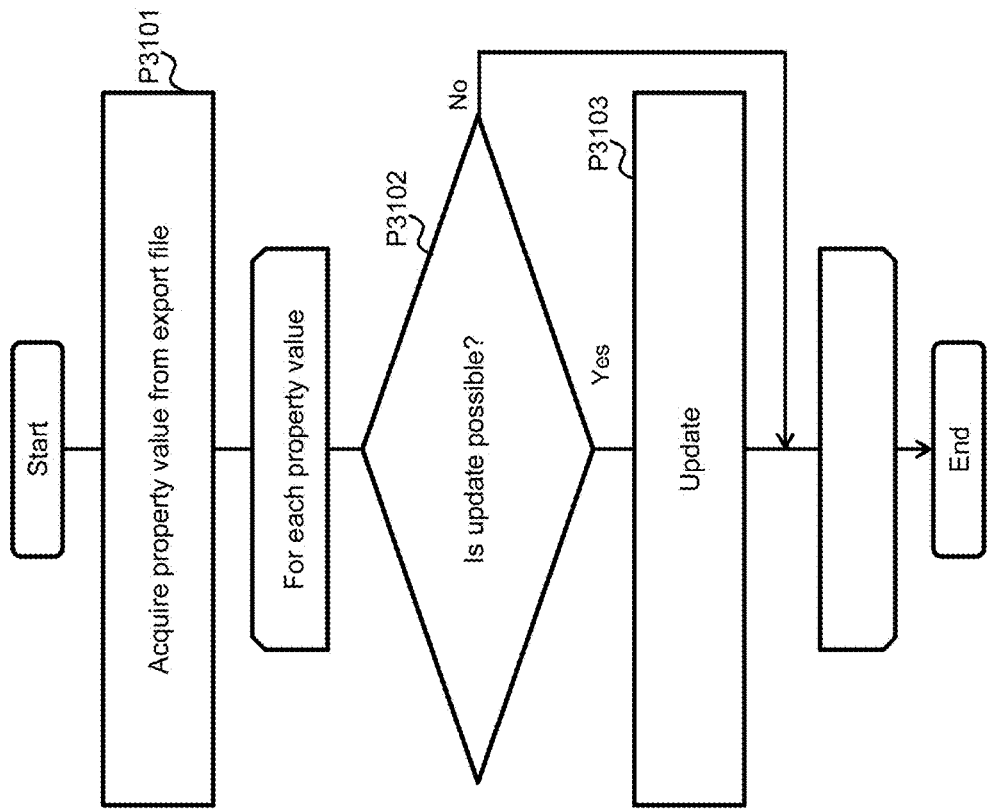
FIG. 21 is a flowchart of first import processing.
Figure 22:
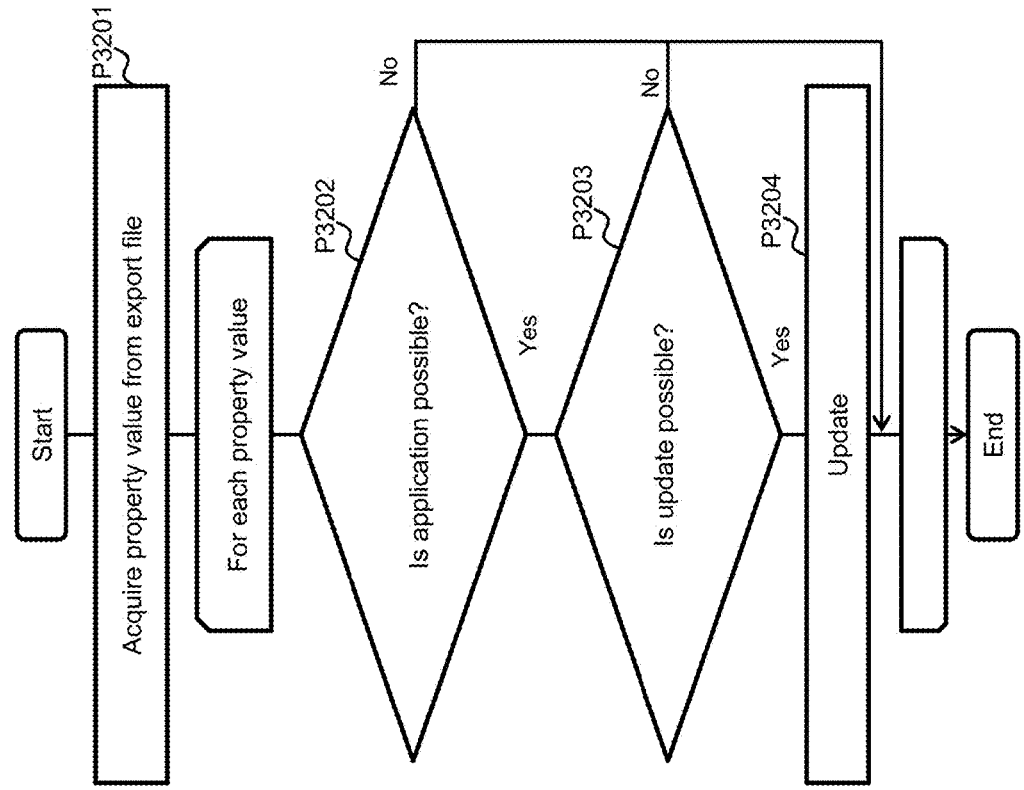
FIG. 22 is a flowchart of second import processing.

When the status as an execution result of the debugging target component is "Failed" (No at P3005), import processing illustrated in FIG. 21 or 22 is performed (P3006). Thereafter, P3004 is repeated. As an exemplary result of P3006, a display content of the property list UI 2813 illustrated in FIG. 19 may be displayed at the repeated P3004. An exemplary result of the repeated P3004 may be the display content of the screen 2800 illustrated in FIG. 19.

FIG. 21 is a flowchart of first import processing.

The service debugger 432 acquires an input value (property value) from an exported file (specifically, the export-import property table 1500 output at P3003) of the debugging target component (P3101). The following processing is performed for each acquired input value.

Specifically, the service debugger 432 determines whether the corresponding input value (for example, an input value exported right before P3004 (for example, P3003)) can be updated to the input value acquired at P3101 (for example, the input value exported at P3004) (whether the acquired input value can be applied) (P3102). Specifically, for example, the service debugger 432 determines whether the acquired input value satisfies the corresponding input condition 707 and the update permission is "True". When the determination is positive (Yes at P3102), the service debugger 432 updates the corresponding input value to the acquired input value (P3103).

When inputting of an input value is not essential (the necessity 711 is not "Required"), the debugging target component may be executed for an input property corresponding to an input value, the update of which is determined not to be permitted, without an input value to the debugging target component. When an input value is changed by a user, P3102 may be performed on the changed input value.

FIG. 22 is a flowchart of second import processing.

The service debugger 432 executes at least one of acquisition of an input value from an exported file (specifically, the export-import property table 1500 output at P3003) of the debugging target component and acquisition of an output value from an exported file of a component right before the debugging target component (P3201). The following processing is performed on each acquired property.

Specifically, when the property value acquired at P3201 is an output value from an export file of the component right before, the service debugger 432 determines whether the output value can be applied as an input value (P3202). Specifically, for example, the determination at P3202 is negative when the service maintenance property table 1600 (FIG. 16) holding the output value as the property value 1603 does not exist. The determination at P3202 is positive when the service maintenance property table 1600 holding the output value as the property value 1603 exists.

When the determination at P3202 is positive, the service debugger 432 determines whether an input value (for example, an input value exported right before P3004 (for example, P3003)) corresponding to the mapping target 710 same as that to which the key name 1601 in the service maintenance property table 1600 corresponds can be updated to the property value acquired at P3201 (P3203). This determination may be same as that at P3102 illustrated in FIG. 21. When the determination at P3203 is positive (Yes at P3203), the service debugger 432 updates the corresponding input value to the acquired property value (P3204).

Whether to apply the first import processing illustrated in FIG. 21 or the second import processing illustrated in FIG. 22 may be determined in advance or dynamically selected. In the latter case, for example, the service debugger 432 may select the first import processing when each input property of the debugging target component is configured to be a value that is invalid as the mapping target 710. The service debugger 432 may select the second import processing when each input property of the debugging target component is configured t a value that is valid as the mapping target 710.

The above-described embodiment is exemplary for description of the present invention and not intended to limit the scope of the present invention. The present invention may be achieved in other various kinds of embodiments.

REFERENCE SIGNS LIST

301 operation automation system
311 management server
312 management client

The invention claimed is:

1. A method for assisting with debugging, the method comprising:
   exporting at least one of an input package and an output package for at least one execution target component to a storage resource in a test of a component-set whole process including a plurality of components and in which an order of execution of the plurality of components is defined, each of the plurality of components being a significant processing module as a set of one or more processing steps and independent of any other component, each input package including an input property of a component corresponding to the input package, each input property including an input value, each output package including an output property of a component corresponding to the output package, and each output property including an output value; and
   (B) importing at least one of following (X1) and (X2) to a debugging target component to execute the debugging target component without executing a component an order of which precedes an order N (where N is a natural number greater than 1) of the debugging target component, wherein the importing is performed by:
      (b1) displaying an input value of the debugging target component in at least one of an exported input package of the debugging target component and an exported output package of the component the order of which is the order "N−1",
      (b2) receiving, when the displayed input values include an input value selected by a user, an input value obtained by changing the selected input value,
      (b3) importing the input values obtained through (b1) and (b2) to the debugging target component, and
      (b4) executing the debugging target component, wherein (b1) to (b4) are repeated until at least the debugging target component is successfully executed;
   wherein (X1) is an input value of the debugging target component in at least one of the exported input package of the debugging target component and the exported output package of a component an order of which is an order "N−1", and
   wherein (X2) is an input value of the debugging target component, which is updated by the user, in at least one of the exported input package of the debugging target component and the exported output package of the component an order of which is the order "N−1".

2. The method for assisting with debugging according to claim 1 wherein, in (A), the input package is exported together with the output package for at least one component of the plurality of components.

3. The method for assisting with debugging according to claim 1, wherein, in (A), for at least one component of the plurality of components, the output package including an output value mapped as an input value of a component an order of which is next to the at least one component is exported.

4. The method for assisting with debugging according to claim 1, wherein, in (B), the execution of the debugging target component without executing a component an order of which precedes an order N skips execution of each component the order of which precedes the order N.

5. The method for assisting with debugging according to claim 1 wherein the component-set whole process is a service for system operation of an operation target system including one or more operation target apparatuses or is a template of the service.

6. A non-transitory tangible computer readable storage medium storing instructions, the instructions when executed cause a processor to execute a method, the method comprising:
   (A) exporting at least one of an input package and an output package for at least one execution target component to a storage resource in a test of a component-set whole process including a plurality of components and in which an order of execution of the plurality of components is defined, each of the plurality of components being a significant processing module as a set of one or more processing steps and independent of any other component, each input package including an input property of a component corresponding to the input package, each input property including an input value, each output package including an output property of a component corresponding to the output package, and each output property including an output value; and
   (B) importing at least one of following (X1) and (X2) to a debugging target component to execute the debugging target component without executing a component an order of which precedes an order N (where N is a natural number greater than 1) of the debugging target component, wherein the importing is performed by:
      (b1) displaying an input value of the debugging target component in at least one of an exported input package of the debugging target component and an exported output package of the component the order of which is the order "N−1",
      (b2) receiving, when the displayed input values include an input value selected by a user, an input value obtained by changing the selected input value,
      (b3) importing the input values obtained through (b1) and (b2) to the debugging target component, and
      (b4) executing the debugging target component, wherein (b1) to (b4) are repeated until at least the debugging target component is successfully executed;
   wherein (X1) is an input value of the debugging target component in at least one of the exported input package of the debugging target component and the exported output package of a component an order of which is an order "N−1", and
   wherein (X2) is an input value of the debugging target component, which is updated by the user, in at least one of the exported input package of the debugging target component and the exported output package of the component the order of which is the order "N−1".

7. The non-transitory tangible computer readable storage medium according to claim 6, wherein, in (A), the input package is exported together with the output package for at least one component of the plurality of components.

8. The non-transitory tangible computer readable storage medium according to claim 6, wherein, in (A), for at least one component of the plurality of components, the output package including an output value mapped as an input value of a component an order of which is next to the at least one component, is exported.

9. The non-transitory tangible computer readable storage medium according to claim 6, wherein, in (B), the execution of the debugging target component without executing a component an order of which precedes an order N, skips execution of each component the order of which precedes the order N.

10. The non-transitory tangible computer readable storage medium according to claim 6, wherein the component-set whole process is a service for operation automation of an operation target system including one or more operation target apparatuses or is a template of the service.

11. A computer system comprising:
a storage memory; and
a processor communicatively coupled to the storage memory, wherein the processor is configured to:
(A) export at least one of an input package and an output package for at least one execution target component to the storage resource in a test of a component-set whole process including a plurality of components and in which an order of execution of the plurality of components is defined, each of the plurality of components being a significant processing module as a set of one or more processing steps and independent of any other component, each input package including an input property of a component corresponding to the input package, each input property including an input value, each output package including an output property of a component corresponding to the output package, and each output property including an output value; and
(B) import at least one of following (X1) and (X2) to a debugging target component to execute the debugging target component without executing a component an order of which precedes an order N (where N is a natural number greater than 1) of the debugging target component, wherein the importing is performed by:
(b1) displaying an input value of the debugging target component in at least one of an exported input package of the debugging target component and an exported output package of the component the order of which is the order "N−1",
(b2) receiving, when the displayed input values include an input value selected by a user, an input value obtained by changing the selected input value,
(b3) importing the input values obtained through (b1) and (b2) to the debugging target component, and
(b4) executing the debugging target component, wherein (b1) to (b4) are repeated until at least the debugging target component is successfully executed;
wherein (X1) is an input value of the debugging target component in at least one of the exported input package of the debugging target component and the exported output package of a component an order of which is an order "N−1", and
wherein (X2) is an input value of the debugging target component, which is updated by the user, in at least one of the exported input package of the debugging target component and the exported output package of the component the order of which is the order "N−1".

* * * * *